United States Patent (10) Patent No.: US 12,314,346 B2
Montalvo (45) Date of Patent: *May 27, 2025

(54) SYSTEMS AND METHODS OF SENSOR DATA FUSION

(71) Applicant: Digital Global Systems, Inc., Tysons Corner, VA (US)

(72) Inventor: Armando Montalvo, Winter Garden, FL (US)

(73) Assignee: Digital Global Systems, Inc., Tysons Corner, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/988,120

(22) Filed: Dec. 19, 2024

(65) Prior Publication Data

US 2025/0124112 A1 Apr. 17, 2025

(51) Int. Cl.
*G06F 18/2431* (2023.01)
*G06F 17/18* (2006.01)
*G06F 18/213* (2023.01)
*G06F 18/25* (2023.01)
*G05D 111/67* (2024.01)
*G06V 10/80* (2022.01)
*G08B 29/18* (2006.01)

(52) U.S. Cl.
CPC .......... *G06F 18/2431* (2023.01); *G06F 18/25* (2023.01); *G05D 2111/67* (2024.01); *G06F 17/18* (2013.01); *G06F 18/213* (2023.01); *G06F 18/256* (2023.01); *G06V 10/80* (2022.01); *G08B 29/188* (2013.01)

(58) Field of Classification Search
CPC ... G06F 18/25; G06F 18/256; G05D 2111/67; G06V 10/80; G08B 29/188
See application file for complete search history.

(56) References Cited

U.S. PATENT DOCUMENTS

| | | |
|---|---|---|
| 9,367,683 B2 | 6/2016 | Kolacinski et al. |
| 10,748,075 B2 | 8/2020 | Chowdhary et al. |
| 10,766,137 B1 | 9/2020 | Porter et al. |
| 11,037,320 B1 | 6/2021 | Ebrahimi Afrouzi et al. |
| 11,586,865 B2 | 2/2023 | Brahma et al. |

(Continued)

FOREIGN PATENT DOCUMENTS

| | | | |
|---|---|---|---|
| CN | 110598299 A | * 12/2019 | ............. G06N 3/006 |
| CN | 110909762 A | 3/2020 | |

(Continued)

OTHER PUBLICATIONS

Machine translation for CN_116522279_A, downloaded 2025 (Year: 2025).*

(Continued)

*Primary Examiner* — John C Kuan
(74) *Attorney, Agent, or Firm* — NEO IP

(57) ABSTRACT

Systems and methods of sensor data fusion including sensor data capture, curation, linking, fusion, inference, and validation. The systems and methods described herein reduce computational demand and processing time by curating data and calculating conditional entropy. The system is operable to fuse data from a plurality of sensor types. A computer processor optionally stores fused sensor that the system validates above a mathematical threshold.

19 Claims, 6 Drawing Sheets

(56) References Cited

U.S. PATENT DOCUMENTS

| | | | |
|---|---|---|---|
| 2008/0312756 A1* | 12/2008 | Grichnik | G05B 19/0423 |
| | | | 707/999.107 |
| 2015/0306770 A1 | 10/2015 | Mittal et al. | |
| 2017/0004411 A1 | 1/2017 | Hassan et al. | |
| 2018/0284758 A1* | 10/2018 | Cella | H04L 67/12 |
| 2019/0206400 A1 | 7/2019 | Cui et al. | |
| 2019/0258251 A1 | 8/2019 | Ditty et al. | |
| 2019/0295001 A1 | 9/2019 | Fusco et al. | |
| 2020/0026289 A1 | 1/2020 | Alvarez et al. | |
| 2021/0150230 A1 | 5/2021 | Smolyanskiy et al. | |
| 2021/0342656 A1* | 11/2021 | Mittal | G06V 10/806 |
| 2022/0012562 A1 | 1/2022 | Lazaro-Gredilla et al. | |
| 2022/0075077 A1 | 3/2022 | Kato et al. | |
| 2022/0126864 A1 | 4/2022 | Moustafa et al. | |
| 2022/0146652 A1 | 5/2022 | Cardei et al. | |
| 2022/0161815 A1 | 5/2022 | Van Beek et al. | |
| 2022/0179056 A1 | 6/2022 | Braley et al. | |
| 2022/0324464 A1 | 10/2022 | Collin et al. | |
| 2023/0082656 A1 | 3/2023 | Li et al. | |
| 2023/0110027 A1 | 4/2023 | Bajpayee et al. | |
| 2023/0112441 A1 | 4/2023 | Tang et al. | |
| 2023/0166765 A1 | 6/2023 | Yoon et al. | |
| 2023/0182768 A1 | 6/2023 | Oh | |
| 2023/0342944 A1 | 10/2023 | Sullivan et al. | |
| 2024/0045426 A1 | 2/2024 | Ditty et al. | |
| 2024/0112428 A1 | 4/2024 | Levi et al. | |
| 2024/0123619 A1 | 4/2024 | Ning | |
| 2024/0142994 A1 | 5/2024 | Ebrahimi Afrouzi | |
| 2024/0152734 A1 | 5/2024 | Ye | |
| 2024/0249165 A1 | 7/2024 | Roche et al. | |
| 2024/0289930 A1 | 8/2024 | Yang et al. | |
| 2024/0289981 A1 | 8/2024 | Kuo et al. | |
| 2024/0296044 A1 | 9/2024 | Day et al. | |
| 2024/0312219 A1 | 9/2024 | Choi et al. | |
| 2024/0317254 A1 | 9/2024 | Tran | |
| 2024/0324838 A1 | 10/2024 | Ebrahimi Afrouzi | |
| 2024/0331403 A1 | 10/2024 | Shen et al. | |
| 2024/0378412 A1 | 11/2024 | Schrader | |
| 2024/0408495 A1 | 12/2024 | Hibi et al. | |
| 2025/0026371 A1 | 1/2025 | Andert et al. | |

FOREIGN PATENT DOCUMENTS

| | | | |
|---|---|---|---|
| CN | 115561795 A | | 1/2023 |
| CN | 116522279 A | * | 8/2023 |
| CN | 118427205 A | | 8/2024 |
| WO | 2024186551 A1 | | 9/2024 |
| WO | 2024228863 A1 | | 11/2024 |

OTHER PUBLICATIONS

Peli et al., "Feature Level Sensor Fusion" Part of the SPIE Conference on Sensor Fusion: Architectures. Algorithms, and Applications III . Orlando, Florida, Apr. 1999 (Year: 1999).*

Chen et al., "Track correlation uncertainty evaluation for Multi-sensor Data Fusion System and its application" 2021 IEEE (Year: 2021).*

Yeong, D. J., Velasco-Hernandez, G., Barry, J., & Walsh, J. (2021). Sensor and sensor fusion technology in autonomous vehicles: A review. Sensors, 21(6), 2140. (Year: 2021).

Ebel, Patrick, and et al. "SEN12MS-CR-TS: A remote-sensing data set for multi modal multitemporal cloud removal." IEEE Transactions on Geoscience and Remote Sensing 60 (2022): 1-14 (Year: 2022).

Wei Z, and et al. MmWave Radar and Vision Fusion for Object Detection in Autonomous Driving: A Review. Sensors (Basel). Mar. 25, 2022;22(7):2542. doi: 10.3390/s22072542. PMID: 35408157; PMCID: PMC9003130 (Year: 2022).

Lanegger et al., "To Fuse or Not to Fuse: Measuring Consistency in Multi-Sensor Fusion for Aerial Robots" Springer, Aug. 2024 (Year: 2024).

Liu et al., "A Method for Improving the Pose Accuracy of a Robot Manipulator Based on Multi-Sensor Combined Measurement and Data Fusion" Sensors 2015, 15, 7933-7952 (Year: 2015).

* cited by examiner

SYSTEMS AND METHODS OF SENSOR DATA FUSION

BACKGROUND OF THE INVENTION

1. Field of the Invention

The present invention relates to physical sensors measuring data and dynamically fusing the physical sensor data to create a new dataset.

2. Description of the Prior Art

It is generally known in the prior art to append data from more than one source.

Prior art patent documents include the following:

U.S. Patent Publication Number 2024/0378412 for methods for topological data analysis ai/ml pipeline (tdaml) with algorithm for multimodal sensor data fusion in autonomy applications, by inventor Paul Thomas Schrader, filed Apr. 25, 2024, published Nov. 14, 2024, directed to a method of topological data analysis feature engineering for data fusion and autonomy is provided. The method comprises providing a Topological Data Analysis AI/ML Pipeline (TDAML) algorithm for multimodal sensor data fusion in autonomy applications system further comprising combining raw heterogeneous multimodal sensor data at the topological level; measuring, recording, and tracking linear representations of an underlying data set; providing a linear representation of the underlying data set which is compatible to existing deep learning (DL) model architectures for training in autonomy tasks; and accessing the entire degree of freedom (DOF) space of raw multimodal sensor data for mitigating sensor modality adversarial threats and environmental attenuation concerns in contested military and civilian (urban) environments.

U.S. Patent Publication Number 2023/0112441 for data fusion and analysis engine for vehicle sensors, by inventors LuAn Tang et al., filed Oct. 6, 2022, published Apr. 13, 2023, directed to systems and methods for data fusion and analysis of vehicle sensor data, including receiving a multiple modality input data stream from a plurality of different types of vehicle sensors, determining latent features by extracting modality-specific features from the input data stream, and aligning a distribution of the latent features of different modalities by feature-level data fusion. Classification probabilities can be determined for the latent features using a fused modality scene classifier. A tree-organized neural network can be trained to determine path probabilities and issue driving pattern judgments, with the tree-organized neural network including a soft tree model and a hard decision leaf. One or more driving pattern judgments can be issued based on a probability of possible driving patterns derived from the modality-specific features.

U.S. Patent Publication Number 2024/0331403 for RGB-T multispectral pedestrian detection method based on target aware fusion strategy, by inventors Huiliang Shen et al., filed Apr. 18, 2024, published Oct. 3, 2024, directed to an RGB-T (Thermal) multispectral pedestrian detection method based on a target aware fusion strategy, which aims to accurately determine the position of pedestrians from a pair of RGB and thermal infrared images. Given a pair of RGB and thermal infrared image to be detected, this method firstly extracts multispectral features from the RGB and thermal infrared images; then the extracted multispectral features are fused by using a target aware fusion strategy; finally, the fused features are sent to a detection head for pedestrian detection, and the pedestrian position box and confidence are output. The method can effectively fuse the deep features of multispectral images, enhance the feature expression of pedestrian areas and suppress irrelevant background noise features during the fusion process, and can realize accurate pedestrian detection.

U.S. Patent Publication Number 20240/312219 for temporal-based perception for autonomous systems and applications, by inventor Jiwoong Choi et al., filed Mar. 16, 2023, published Sep. 19, 2024, directed to temporal-based perception for autonomous or semi-autonomous systems and applications is described. Systems and methods are disclosed that use a machine learning model (MLM) to intrinsically fuse feature maps associated with different sensors and different instances in time. To generate a feature map, image data generated using image sensors (e.g., cameras) located around a vehicle are processed using a MLM that is trained to generate the feature map. The MLM may then fuse the feature maps in order to generate a final feature map associated with a current instance in time. The feature maps associated with the previous instances in time may be preprocessed using one or more layers of the MLM, where the one or more layers are associated with performing temporal transformation before the fusion is performed. The MLM may then use the final feature map to generate one or more outputs.

U.S. Patent Publication Number 2024/0289981 for localization of objects encoded in image data in accordance with natural language queries, by inventors Wei-Chen Kuo et al., filed Feb. 23, 2023, published Aug. 29, 2024, directed to generalized objected location, where the located object is in accordance to a natural language (NL) query. More specifically, the embodiments include a unified generalized visual localization architecture. The architecture achieves enhanced performance on the following three tasks: referring expression comprehension, object localization, and object detection. The embodiments employ machine-learned NL models and/or image models. The architecture is enabled to understand and answer natural localization questions towards an image, to output multiple boxes, provide no output if the object is not present (e.g., a null result), as well as, solve general detection tasks.

U.S. Patent Publication Number 2023/0342944 for a system and method for motion prediction in autonomous driving, by inventors Alan Sullivan et al., filed Apr. 20, 2022, published Oct. 26, 2023, directed to a system and a method for motion prediction for autonomous driving. The system disclosed herein provides an efficient deep-neural-network-based system to jointly perform perception and motion prediction from 3D point clouds. This system is able to take a pair of LiDAR sweeps as input and outputs for each point in the second sweep, both a classification of the point into one of a set of semantic classes, and a motion vector indicating the motion of the point within the world coordinate system. The system includes a spatiotemporal pyramid network, which extracts deep spatial and temporal features in a hierarchical fashion. The training of this system is regularized with spatial and temporal consistency losses. Thus providing an improved motion planner for autonomous driving applications.

U.S. Pat. No. 11,586,865 for an apparatus, system and method for fusing sensor data to do sensor translation, by inventors Pratik Prabhanjan Brahma et al., filed Feb. 8, 2021, issued Feb. 21, 2023, directed to technologies and techniques for operating a sensor system including an image sensor and a light detection and ranging (LiDAR) sensor. Image data associated with an image scene of a landscape is received from the image sensor, and LiDAR data associated with a LiDAR scene of the landscape is received from the LiDAR sensor, wherein the LiDAR scene and image scene of the landscape substantially overlap. A machine-learning model is applied to (i) the image data to identify image points of interest in the image data, and (ii) the LiDAR data to identify LiDAR features of interest in the LiDAR data. The LiDAR features of interest and the image points of interest are fused, utilizing an attention mechanism, and generating an output, wherein new LiDAR data is produced, based on the fusing output.

U.S. Pat. No. 11,037,320 for a method for estimating distance using point measurement and color depth, by inventors Ali Ebrahimi Afrouzi et al., filed Jul. 17, 2020, issued Jun. 15, 2021, directed to a method including detecting an object in a line of sight of at least one sensor; adjusting a current path of the robot to include a detour path around the object, instructing the robot to resume along the current path after avoiding the object, discarding at least some data collected by sensors of the robot in overlapping areas covered, inferring previously visited areas and unvisited areas, generating a planar representation of a workspace of the robot by stitching data collected by at least some sensors of the robot at overlapping points, and presenting at least the planar representation and coverage statistics on an application of a communication device.

U.S. Pat. No. 10,748,075 for a method and apparatus for energy efficient probabilistic context awareness of a mobile or wearable device user by switching between a single sensor and multiple sensors, by inventors Mahesh Chowdhary et al., filed Oct. 21, 2016, issued Aug. 18, 2020, directed to a method of operating an electronic device. The method includes activating a first sensing device, and determining a first probabilistic context of the electronic device relative to its surroundings. The method includes outputting the first probabilistic context, and determining a confidence measure of the first probabilistic context. Where the confidence measure of the first probabilistic context is below a threshold, the method includes activating a second sensing device, determining a second probabilistic context of the electronic device relative to its surroundings. outputting the second probabilistic context, and determining a confidence measure of the second probabilistic context. Where the confidence measure of the second probabilistic context is above the threshold, the second sensing device is deactivated and the method returns to determining the first probabilistic context.

U.S. Pat. No. 9,367,683 for cyber security, by inventors Richard M. Kolacinski, filed Mar. 14, 2014, issued Jun. 14, 2016, directed to systems and methods that use probabilistic grammatical inference and statistical data analysis techniques to characterize the behavior of systems in terms of a low dimensional set of summary variables and, on the basis of these models, detect anomalous behaviors are disclosed. The disclosed information-theoretic system and method exploit the properties of information to deduce a structure for information flow and management. The properties of information can provide a fundamental basis for the decomposition of systems and hence a structure for the transmission and combination of observations at the desired levels of resolution (e.g., component, subsystem, system).

SUMMARY OF THE INVENTION

The present invention is related to systems and methods for sensor data fusion that formulate new data each time at least two heterogeneous, partially heterogeneous, or homogeneous data points are fused. For example, a first sensor output is mathematically linked to a second sensor output if the mathematical link between the first sensor output and the second sensor output exceeds a predefined threshold. A computer processor fuses the first sensor output and the second sensor output together, creating a unique dataset that includes at least one new data point associated with the first sensor output and the second sensor output that is mathematically validated.

It is an object of this invention to increase sensor data fusion accuracy while reducing computational processing requirements and storage demands. The present invention provides a method of fusing at least two heterogeneous, partially heterogenous, or homogenous data points together to create at least one new data point and/or validate the accuracy of the at least one new data point.

In one embodiment, the present invention is related to a system for sensor data fusion for sensor management and utilization, including at least one computer processor including a memory, at least one curation engine, at least one link engine, at least one fusion engine, at least one inference engine, and at least one validation engine, at least one first sensor, being of a first sensor type, operable to measure a first parameter of an environment and/or a machine, and at least one second sensor, being of a second sensor type, operable to measure a second parameter of the environment and/or the machine, wherein the at least one computer processor is operable to analyze the first parameter and the second parameter, wherein the at least one computer processor is operable to receive at least one query, wherein the at least one curation engine is operable to curate the first parameter and the second parameter, the at least one link engine is operable to link the first parameter and the second parameter, the at least one fusion engine is operable to fuse the first parameter and the second parameter, the at least one inference engine is operable to determine an inference from the first parameter and the second parameter, and the at least one validation engine is operable to validate the first parameter and the second parameter, wherein the at least one curation engine is operable to curate the first parameter and the second parameter by categorizing the first parameter and the second parameter into at least one property and/or sub-property based in part on the at least one query, wherein the at least one curation engine is operable to filter the first parameter and the second parameter based in part on the at least one property and/or sub-property before storing the first parameter and the second parameter, wherein the at least one curation engine is operable to calculate a degree of certainty that the at least one property and/or sub-property of the at least one first sensor is correlated to the at least one property and/or sub-property of the at least one second sensor, and wherein the at least one fusion engine is operable to fuse the first parameter and the second parameter, wherein the at least one fusion engine creates at least one new data set.

In another embodiment, the present invention is related to a method for sensor data fusion for sensor management and utilization, including providing at least one computer processor including a memory, providing at least one curation engine, at least one link engine, at least one fusion engine, at least one inference engine, and at least one validation engine, at least one first sensor, being of a first sensor type, measuring a first parameter of an environment and/or a machine, and at least one second sensor, being of a second sensor type, measuring a second parameter of the environment and/or the machine, analyzing by the at least one computer processor the first parameter and the second parameter, receiving by the computer processor at least one query, curating the first parameter and the second parameter via the at least one curation engine, linking the first parameter and the second parameter via the at least one link engine, fusing the first parameter and the second parameter via the at least one fusion engine, determining an inference from the first parameter and the second parameter via the at least one inference engine, and validating the first parameter and the second parameter via the at least one validation engine, curating the first parameter and the second parameter by categorizing the first parameter and the second parameter into at least one property and/or sub-property based in part on the at least one query, filtering by the at least one curation engine the first parameter and the second parameter based in part on the at least one property and/or sub-property before storing the first parameter and the second parameter, calculating by the at least one curation engine a degree of certainty that the at least one property and/or sub-property of the at least one first sensor is correlated to the at least one property and/or sub-property of the at least one second sensor, fusing the first parameter and the second parameter, and creating via the at least one fusion engine at least one new data set.

In yet another embodiment, the present invention is related to a system for sensor data fusion for sensor management and utilization, including at least one computer processor including a memory, at least one curation engine, at least one link engine, at least one fusion engine, at least one inference engine, and at least one validation engine, at least one first sensor, being of a first sensor type, operable to measure a first parameter of an environment and/or a machine, and at least one second sensor, being of a second sensor type, operable to measure a second parameter of the environment and/or the machine, wherein the at least one computer processor is operable to analyze the first parameter and the second parameter, wherein the at least one computer processor is operable to receive at least one query, wherein the at least one curation engine is operable to curate the first parameter and the second parameter, the at least one link engine is operable to link the first parameter and the second parameter, the at least one fusion engine is operable to fuse the first parameter and the second parameter, the at least one inference engine is operable to determine an inference from the first parameter and the second parameter, and the at least one validation engine is operable to validate the first parameter and the second parameter, wherein the at least one curation engine is operable to curate the first parameter and the second parameter by categorizing the first parameter and the second parameter into at least one common property and/or common sub-property based in part on the at least one query, wherein the at least one curation engine is operable to filter the first parameter and the second parameter based in part on the at least one common property and/or common sub-property before storing the first parameter and the second parameter, wherein the at least one curation engine is operable to calculate a degree of certainty that the at least one common property and/or common sub-property of the at least one first sensor is correlated to the at least one common property and/or common sub-property of the at least one second sensor, and wherein the at least one fusion engine is operable to fuse the first parameter and the second parameter, wherein the at least one fusion engine creates at least one new data set.

These and other aspects of the present invention will become apparent to those skilled in the art after a reading of the following description of the preferred embodiment when considered with the drawings, as they support the claimed invention.

DETAILED DESCRIPTION

Figure 1A:
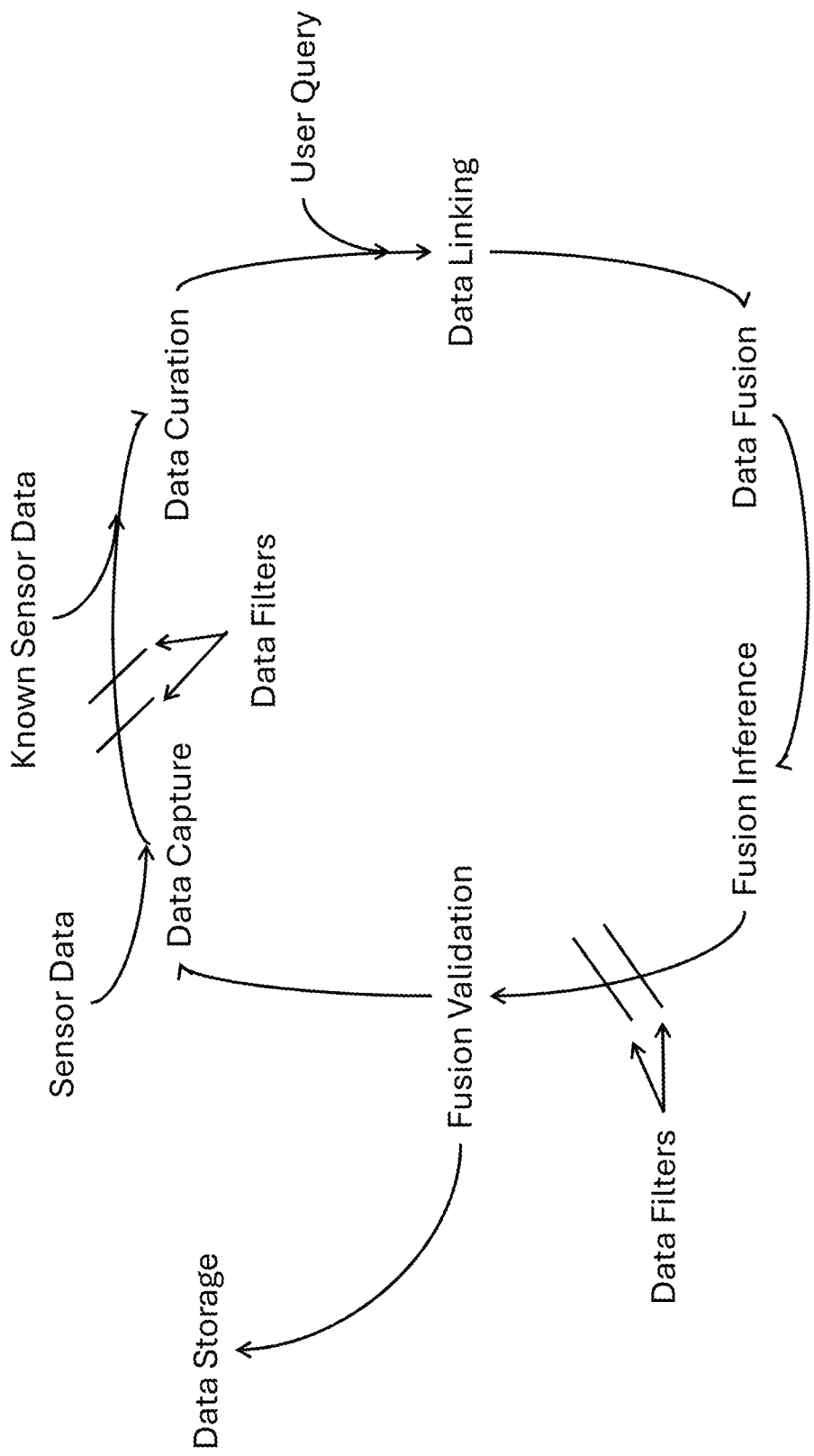
FIG. 1A illustrates a data lifecycle according to one embodiment of the present invention.

The present invention is generally directed to systems and methods for sensor data fusion that formulate new data each time at least two heterogeneous, partially heterogeneous, or homogeneous data points are fused. For example, a first sensor output is mathematically linked to a second sensor output if the mathematical link between the first sensor output and the second sensor output exceeds a predefined threshold. A computer processor fuses the first sensor output and the second sensor output together, creating a unique dataset that includes at least one new data point associated with the first sensor output and the second sensor output that is mathematically validated.

In one embodiment, the present invention is related to a system for sensor data fusion for sensor management and utilization, including at least one computer processor including a memory, at least one curation engine, at least one link engine, at least one fusion engine, at least one inference engine, and at least one validation engine, at least one first sensor, being of a first sensor type, operable to measure a first parameter of an environment and/or a machine, and at least one second sensor, being of a second sensor type, operable to measure a second parameter of the environment and/or the machine, wherein the at least one computer processor is operable to analyze the first parameter and the second parameter, wherein the at least one computer processor is operable to receive at least one query, wherein the at least one curation engine is operable to curate the first parameter and the second parameter, the at least one link engine is operable to link the first parameter and the second parameter, the at least one fusion engine is operable to fuse the first parameter and the second parameter, the at least one inference engine is operable to determine an inference from the first parameter and the second parameter, and the at least one validation engine is operable to validate the first parameter and the second parameter, wherein the at least one curation engine is operable to curate the first parameter and the second parameter by categorizing the first parameter and the second parameter into at least one property and/or sub-property based in part on the at least one query, wherein the at least one curation engine is operable to filter the first parameter and the second parameter based in part on the at least one property and/or sub-property before storing the first parameter and the second parameter, wherein the at least certainty that the at least one property and/or sub-property of the at least one first sensor is correlated to the at least one property and/or sub-property of the at least one second sensor, and wherein the at least one fusion engine is operable to fuse the first parameter and the second parameter, wherein the at least one fusion engine creates at least one new data set.

In another embodiment, the present invention is related to a method for sensor data fusion for sensor management and utilization, including providing at least one computer processor including a memory, providing at least one curation engine, at least one link engine, at least one fusion engine, at least one inference engine, and at least one validation engine, at least one first sensor, being of a first sensor type, measuring a first parameter of an environment and/or a machine, and at least one second sensor, being of a second sensor type, measuring a second parameter of the environment and/or the machine, analyzing by the at least one computer processor the first parameter and the second parameter, receiving by the computer processor at least one query, curating the first parameter and the second parameter via the at least one curation engine, linking the first parameter and the second parameter via the at least one link engine, fusing the first parameter and the second parameter via the at least one fusion engine, determining an inference from the first parameter and the second parameter via the at least one inference engine, and validating the first parameter and the second parameter via the at least one validation engine, curating the first parameter and the second parameter by categorizing the first parameter and the second parameter into at least one property and/or sub-property based in part on the at least one query, filtering by the at least one curation engine the first parameter and the second parameter based in part on the at least one property and/or sub-property before storing the first parameter and the second parameter, calculating by the at least one curation engine a degree of certainty that the at least one property and/or sub-property of the at least one first sensor is correlated to the at least one property and/or sub-property of the at least one second sensor, fusing the first parameter and the second parameter, and creating via the at least one fusion engine at least one new data set.

In yet another embodiment, the present invention is related to a system for sensor data fusion for sensor management and utilization, including at least one computer processor including a memory, at least one curation engine, at least one link engine, at least one fusion engine, at least one inference engine, and at least one validation engine, at least one first sensor, being of a first sensor type, operable to measure a first parameter of an environment and/or a machine, and at least one second sensor, being of a second sensor type, operable to measure a second parameter of the environment and/or the machine, wherein the at least one computer processor is operable to analyze the first parameter and the second parameter, wherein the at least one computer processor is operable to receive at least one query, wherein the at least one curation engine is operable to curate the first parameter and the second parameter, the at least one link engine is operable to link the first parameter and the second parameter, the at least one fusion engine is operable to fuse the first parameter and the second parameter, the at least one inference engine is operable to determine an inference from the first parameter and the second parameter, and the at least one validation engine is operable to validate the first parameter and the second parameter, wherein the at least one curation engine is operable to curate the first parameter and the second parameter by categorizing the first parameter and the second parameter into at least one common property and/or common sub-property based in part on the at least one query, wherein the at least one curation engine is operable to filter the first parameter and the second parameter based in part on the at least one common property and/or common sub-property before storing the first parameter and the second parameter, wherein the at least one curation engine is operable to calculate a degree of certainty that the at least one common property and/or common sub-property of the at least one first sensor is correlated to the at least one common property and/or common sub-property of the at least one second sensor, and wherein the at least one fusion engine is operable to fuse the first parameter and the second parameter, wherein the at least one fusion engine creates at least one new data set.

None of the prior art discloses sensor data fusion that curates and links sensor data before fusion occurs and wherein the sensor data fusion produces a unique data set before the data is stored.

For the purposes of this application, the term "heterogeneous" as it applies to sensor data relates to sensor data including different properties from sensor data of at least one other sensor. For example, a sensor measuring velocity of a vehicle and a sensor measuring the distance of the vehicle from an object are heterogeneous because the sensors are measuring fundamentally different properties. The term "partially heterogeneous" as it applies to sensor data fusion relates to sensor data including at least one common property and at least one uncommon property from at least one other sensor. For example, a sensor in a radio frequency (RF) environment that measures bandwidth and signal modulation of a signal and a sensor that measures bandwidth and signal-to-noise ratio of a signal are partially heterogeneous because each of the sensors measures at least one common property (bandwidth) and at least one uncommon property (signal-to-noise ratio and signal modulation). The term "homogeneous" as it applies to sensor data fusion relates to sensor data from at least two sensors that include the same property and sub-property. For example, a vehicle that uses a camera and Light Detection and Ranging (LiDAR) to create measurements from the distance from an object share a common property (measured distance to an object). However, the camera detects ten objects, whereas the LiDAR sensor detects fifteen objects. The objects that both the camera and the LiDAR sensor detect are common sub-properties between data from these two sensors. Homogenous sensor data refers to the common sub-properties of the camera and LiDAR sensors (two different sensors detecting range, specifically, the range of a common object).

Prior art systems fail to create actionable data via sensor data fusion of heterogeneous, partially heterogeneous, or homogeneous data sources because traditional systems often utilize data lakes and/or large data repositories. A data lake is a centralized repository that ingests and stores large volumes of data in the data's original form. A data lake stores relational and non-relational data from many sources, such as mobile applications, Internet of Things (IoT) devices, social media, streaming services, and other data sources without having to define the structure or schema of the data until the data is read. To make use of a data lake, a wide range of tools is required to create a cohesively layered architecture. To obtain any actionable results from a data lake, a user must query the data lake (i.e., fish for results), to access the data and cause the data to be read. Once the system has computed the probability that the data in the lake is relevant to the query, the system returns the results to the user. Essentially, data lakes store immense amounts of raw information, requiring excessive storage capacity, and only combine data after processing the query against all data in the data lake, requiring excessive computational processing which creates an issue for scalability and limits use of data or makes impossible use of data within a meaningful timeframe for devices or systems with smaller processing capabilities.

Querying a data repository simply appends various sensor data, without adding additional information. Importantly, there is a need for a system that is operable to fuse sensor data and create additional information about sensor accuracy, confidence values, make predictions about future events, etc. Further, a data repository simply outputs data relevant to a user query based on data already in the data repository. There is a need for a system that filters captured data, curates the captured data, and links the curated data based on a user query, instead of appending information that has already been collected and stored. There is a need for a system that customizes sensor data fusion in real-time based on a user query.

Prior art systems that use data repositories that require enough electricity to power thousands of homes for a day. Therefore, there is an unmet need to establish reliable information from incoming sensor data without excessive power, computational, and/or storage requirements.

While some prior art systems attempt to solve the problem of data lakes by indexing stored data, a correlation between a query and the indexed data is not generated until a user inputs the query. Thus, once a user generates a query, the system processes the query against the stored data to find correlations between the query and the indexed data before producing results, requiring less computational power than an unstructured data lake, but still requiring a problematic amount of power and/or computing time.

Therefore, there is a need for systems and methods of fusing heterogeneous, partially heterogeneous, and homogeneous data that minimize power consumption and reduce data storage by correlating data before the data is stored and fused together.

The present invention includes a method of sensor data fusion operable to correlate and fuse data, thereby creating a unique set of data from at least two heterogeneous, partially heterogeneous, and/or homogeneous data sources. The sensor data fusion method includes a computer processor capturing data, curating the data, linking the data, fusing the data, drawing an inference, validating the fused data, and/or optionally storing the fused data.

Traditional data fusion processes occur after a system stores data in a data repository. Only when a user queries the data repository does a traditional data fusion process begin. After the user queries the data repository, a traditional system will search the repository to find data related to the user query and append various data points to each other, without providing any additional information. Importantly, traditional systems do not create a new data set when fusing sensor data. The prior art fails to create an association between data before the data is fused. The prior art also fails to create a new dataset after fusing sensor data. Creating a new dataset when fusing information enables a user to make predictions about the accuracy of a data source and/or make predictions about future events. Calculating data accuracy and the probability of future events is critical in modern society. Technology such as robotics, advanced manufacturing, satellite command and control, satellite communications, Internet of Things (IoT) devices, autonomous driving, and virtual reality are just some of the crucial applications that require fused data to determine the accuracy of a sensor, provide command and control of devices, and predict future events. For example, in autonomous driving, it is paramount to ensure a camera and/or a LiDAR sensor are accurately monitoring and/or predicting traffic patterns and monitoring and/or predicting whether an object is likely to enter the road while an autonomous vehicle is transporting passengers. Creating a new dataset based on fused data creates a system where mathematical associations enable the system to determine the accuracy of data generated by a sensor without human intervention and statistically predict a future event. The new data set described in the present application allows for increased accuracy and/or information breadth due to the mathematical associations generated by combining and verifying at least two sensor data sources.

Current sensor data fusion principles fail to ensure sensor accuracy. Generally, sensor data fusion follows a majority model. That is, a plurality of homogeneous sensors each detect an event. A computer system communicates with each of the plurality of homogeneous sensors to determine if a majority of the sensors detected a similar event. If a majority of the sensors detected an event, the data is fused together based on the conclusion that the event did in fact occur. However, these systems provide no actionable information about the accuracy of the sensors. The computer system does not determine the accuracy of the data relating to the event, just that an event occurred. Often, practical applications include at least two sensors collecting heterogeneous or partially heterogeneous data. Prior art systems store each set of data from the at least two sensors in a data repository, without linking the heterogeneous or partially heterogenous data. Only when a user queries the data repository does the system search for heterogeneous or partially heterogeneous data that may be associated with the user's query. This process is slow, computationally intensive, and requires immense storage. Furthermore, the system fails to provide additional information to the original sensor data, creating nothing actionable.

The systems and methods of the present invention provide scalable sensor data fusion that reduces computational requirements and creates additional actionable data. Advantageously, the present invention minimizes storage requirements because only fused data is stored, reduces computational requirements because sensor data is curated before and/or after a computer processor receives a user and/or computer query, and enhances sensor accuracy by providing additional actionable data.

Referring now to the drawings in general, illustrations are for the purpose of describing one or more preferred embodiment of the invention and are not intended to limit the invention thereto.

The present invention provides systems and methods for sensor data fusion by capturing, curating, linking, fusing, inferring, validating, and optionally storing at least two sensor data points. The present invention uses real-time and/or near real-time processing of sensor data points (e.g., parallel processing) and corresponding data properties and/or characteristics using know sensor data and changes in sensor data using artificial intelligence to enable near real-time sensor data fusion and create new, actionable data based at least in part on the at least two sensor data points.

The systems and methods according to the present invention preferably are operable to fuse sensor data in near real time and more preferably are operable to capture, curate, link, fuse, infer, and/or validate in near real time, and even more preferably are operable to perform sensor data fusion and any near real time operation within about 1 second or less. In one embodiment, near real time is defined as computations completed before data marking an event change. For example, if a sensor creates measurements from an event every second, "near real time" is defined as completing computations in less than one second. Advantageously, the present invention and its real-time functionality described herein uniquely provide and enable the system to compare captured sensor data to a set of known sensor data, link the captured sensor data and the set of known sensor data, fusing the captured sensor data to the set of known sensor data, thereby creating a new unique set of data, infer statistical relevance of the new unique set of data, and mathematically validate the fused data (i.e., the captured sensor data, the known sensor data, and the new unique set of data). In one embodiment, the system compares captured sensor data to a set of historically recorded sensor data (e.g., 15 minutes to 30 days) and/or historical database sensor data in near real-time. In one embodiment, the data from each sensor are communicated via a network to at least one server computer and optionally stored on a database in a virtualized or cloud-based computer system, and the data is available for secure, remote access via the network from distributed remote devices having software application operable thereon, for example by web access (mobile application) or computer access (desktop application). The at least one server computer is operable to curate, link, fuse, infer, and validate the captured data, the set of known sensor data, and new data created after the system fuses the combination of the captured data and the set of known sensor data. In another embodiment, the data from each sensor are communicated via a network to an edge computer. The edge computer is operable to curate, link, fuse, infer, and validate the captured data, the set of known sensor data, and new data created after the system fuses the combination of the captured data and the set of known sensor data. In yet another embodiment, the data from each sensor are analyzed on and on-premises (i.e., within a machine and/or environment) computer. The on-premises computer is operable to curate, link, fuse, infer, and validate the captured data, the set of known sensor data, and new data created after the system fuses the combination of the captured data and the set of known sensor data.

Embodiments are directed to sensor data fusion creating new, actionable data that is configured to obtain sensor data over a wide range of applications and curate the sensor data to supplement and/or combine with existing sensor data given that the new sensor data has at least some correlation to the existing sensor data. Embodiments also provide applications in robotics, advanced manufacturing, satellite command and control, satellite communications, IoT, and autonomous transportation, and any other application using at least two sensors.

The system preferably is operable to capture and curate sensor data before receiving a query from a user and/or computer, and is further operable to link, fuse, infer, validate, and optionally store the sensor data depending on the application. In one embodiment, the sensor data includes a time range the sensor data was collected.

In another embodiment, the system is operable to capture and curate sensor data after receiving a query from a user and/or computer, and is further operable to link, fuse, infer, validate, and optionally store the sensor data depending in part on the application and/or query received by the system.

In one embodiment, the time range is preferably as large as possible to ensure accuracy of sensor data samples and to avoid outliers negatively impacting system accuracy. In one embodiment, at least two sensors are monitored for 24 hours. In another embodiment, the system is operable to fuse sensor data collected over at least 2 seconds. In yet another embodiment, the system is operable to dynamically adjust the fusion of sensor data based upon the application, the conclusion being drawn, the number of sensors from which data is being fused, and/or a user defined parameter. In yet another embodiment, the system is operable to fuse static sensor data (i.e., data not associated with time).

The particular application for which the system is used determines the goals and data output of the present invention. Examples of applications for which the systems and methods of the present invention are operable to be utilized include, but are not limited to, robotics, advanced manufacturing, satellite command and control, satellite communications, IoT, autonomous transportation, and/or virtual reality. Each application is operable to be prioritized within the system according to customer goals.

FIG. 1A illustrates a sensor data lifecycle according to one embodiment of the present invention. Sensor data from at least one sensor is captured and analyzed by a computer processor. Before sensor curation occurs, the system filters out sensor data from the at least one sensor to decrease computational demand. In one embodiment, the system filters sensor data from the at least one sensor by limiting the data based on a user and/or computer query received by the system. The computer processor is further operable to collect known sensor data from a known sensor. In one embodiment, known sensor data includes historical data previously captured by the known sensor and stored on a computer processor. In one embodiment, known sensor data includes new sensor data from a verified source. A verified source includes a sensor with known properties. For example, a LiDAR sensor receiving laser light reflected from an object is known to determine distance from the LiDAR transmitter to the object. In this example, the computer processor is receiving new LiDAR data in real-time, but the LiDAR sensor is verified (i.e., known) because the computer processor verified that the LiDAR sensor is creating measurements from reflected laser light. The system then curates the sensor data from the at least one sensor and the known sensor data. If more data is needed to complete curation from the at least one sensor, the environmental sampling rate is adjusted to gather more or sufficient data.

In one embodiment, data curation includes categorizing properties/parameters of the sensor data from the at least one sensor and the known sensor data, breaking down the sensor data from the at least one sensor and the known sensor into the smallest categories. Categorizing properties of sensor data includes annotating the at least one sensor data and the known sensor data with all operations performed to generate associated metadata including useable output, if the data structure is platform independent, and labeling properties and/or sub-properties of the sensor data. Categorizing properties of sensor data further includes refining raw sensor data into a format suitable for analysis. In one embodiment, data curation includes indexing the sensor data from the at least one sensor and the known sensor according to properties of each set of sensor data. In one embodiment, data curation includes filtering sensor data by properties. Data curation further includes categorizing properties of sensor data from the at least one sensor and the known sensor data such that there is at least one similar property between the at least one sensor and the known sensor.

The system is operable to curate heterogeneous, partially heterogeneous, and homogenous sensor data. In one embodiment, curating heterogeneous sensor data includes an additional step of automatically calculating a common property.

For example, in a nonlimiting embodiment, heterogeneous sensor data curation includes a sensor that captures longitudinal and latitudinal coordinates via a Global Positioning System (GPS) in a vehicle over a predetermined period of time and a known sensor that captures fuel/battery level over the same predetermined period of time. The system then is operable to curate the data according to a time interval of the predetermined period of time and the associated longitudinal and latitudinal position of the vehicle and the fuel/battery level, respectively. An artificial intelligence engine is operable to extract and calculate a common property of the at least one sensor data and the known sensor data. For example, the artificial intelligence engine is operable to determine a speed of the vehicle based on the GPS coordinates over the predetermined period of time and determine a speed of the vehicle based on fuel/battery consumption over the predetermined period of time. The system then categorizes the at least one sensor data and the known sensor data based on the calculated common property. In another embodiment, the system is operable to categorize the at least one sensor data and the known sensor data based on a common time interval. In another embodiment, the system does not categorize the sensor data based on a common property. Rather, the system utilizes an artificial intelligence engine to conduct pattern recognition for heterogeneous sensor data and determine the statistical probability that the categorized heterogeneous sensor data is related.

As a second example, in a nonlimiting embodiment, partially heterogeneous sensor data curation includes sensor data from the at least one sensor and the known sensor data including at least one common property. In this example, a GPS sensor includes longitudinal and latitudinal coordinates and calculates the speed of the vehicle based on the GPS data. The known sensor data is operable to include a sensor that creates measurements from tire revolutions per minute and calculate the speed of the vehicle based on the tire data. Each sensor creates measurements from the common property of vehicle speed. In this embodiment, the system is operable to categorize the at least one sensor data and the known sensor data based in part on the common property.

As a third example, in a nonlimiting embodiment, homogenous data curation includes sensor data from the at least one sensor and the known sensor including all common properties and at least one common sub-property. In this example, an autonomous vehicle includes a camera and a LiDAR sensor. Each respective sensor is operable to create at least one measurement from a property, that is, a distance from the autonomous vehicle to a plurality of objects. The camera measures the distance to twenty objects and the LiDAR sensor measures the distance to ten objects. A trash can on the side of the road is operable to be an object both the camera and the LiDAR sensor measure the distance to. The distance to the trash can, then, is a sub-property of the overall property of distance measured. Therefore, both sensors include the property of distance measured, and both sensors include the sub-property of distance measured to the trash can. In this embodiment, the system is operable to categorize the sensor data based at least on the common sub-property.

The curation phase of a sensor data life cycle categorizes all sensor data so that the system easily determines common properties and/or sub-properties of the at least one sensor data and the known data.

In one embodiment, the curation phase of a sensor data life cycle occurs in real time or near-real time, such that the sensor data from the at least one sensor and the known sensor data are categorized as the computer processor receives the sensor data. In another embodiment, the curation phase is completed using a programmable decision tree such that a computer processor follows a series of standardized steps after the computer processor receives sensor data and categorizes properties of the sensor data accordingly. After the data curation phase is complete, the at least one sensor data and the known sensor data remain distinct but are categorized such that properties and/or sub-properties from each source are easily associated with one another. In one embodiment, the computer system utilizes an artificial intelligence engine to conduct pattern recognition to calculate a statistical probability that common properties and/or sub-properties of the at least one sensor data and the known sensor data are correlated. Once the system determines the statistical probability the at least one sensor data and the known sensor data are correlated, the system summarizes the curation for the dataset and calculates a degree of certainty that the properties and/or sub-properties of the at least one sensor data and the known sensor data are properly categorized.

The system then receives a user created and/or computer created hypothesis designed to query the system before the system continues the process. To complete the query, the computer processor includes a semantic engine that processes a natural language query of the user and/or computer that determines an objective for the query. For example, the query provided by a user and/or computer is operable to include "what was the average speed of the autonomous vehicle over the last two hours?" Alternatively, a computer is operable to query the system to determine the speed of the vehicle to ensure compliance with speed limit laws. The computer system analyzes the query and determines an objective requirement of curating sensor data related the speed of the vehicle.

After the computer system curates all sensor data, the computer processor completes a series of mathematical calculations to determine if the curated sensor data from the at least one sensor data and the known sensor data are linked (i.e., correlated above a specified threshold) based at least in part on the user and/or computer query received by the system. The linking process includes at least three degrees of linking. A first degree of linking (zero or no data link) includes no association between curated sensor data from the at least one sensor and curated sensor data from the known sensor relevant to the query received by the system from the user and/or computer. For example, the curated sensor data from the at least one sensor and the curated sensor data from the known sensor is operable to include a common property, but the common property is irrelevant to the query received by the system. In this case, the computer system deletes curated sensor data from the at least one sensor and curated sensor data from the known sensor that are not linked based on the query received by the system from the user and/or computer. A second degree of linking (weak link) includes an association between the curated sensor data from the at least one sensor and the curated sensor data from the known sensor relevant to the query received by the system, but not a mathematically sufficient association/link to fuse the sensor data. When curated sensor data from the at least one sensor and the curated sensor data from the known sensor is weakly linked, the mathematical relationship between the curated sensor data from the at least one sensor and the curated sensor data from the known sensor continues to iteratively collect, curate, and compute the relationship between the curated sensor data from the at least one sensor and the curated sensor data from the known sensor until the system determines there is either no association between the sensor data or there is a strong association between the sensor data. A third degree of linking (strong link) includes an association above a specified mathematical threshold. If the system determines the curated sensor data from the at least one sensor and curated sensor data from the known sensor are strongly linked, and therefore relevant to the query received by the system from the user and/or computer, the system fuses the appropriate sensor data depending on the situation. Linking sensor data includes calculating the conditional entropy of the curated sensor data from the at least one sensor and the curated sensor data from the known sensor. In one embodiment, the common property includes a time stamp and/or a sensor data sample measured for the same time. In another embodiment, the common property includes a sensor property. The time stamp includes either the two sensors being linked together by being recorded at the same time or over a substantially similar period of time so that the data is fused based on the change in variables over time.

Starting with basic information theory, the equation $H(X) = -E_x[\log(P(X))]$ represents the entropy of all users, where $H(X)$—entropy of vector of random variables—is the amount of information needed to fully describe each random variable. In this case, the random variables are the at least one sensor and the known sensor. In order to mathematically determine the amount of information needed from a known sensor to fully describe the at least one sensor, the system calculates the conditional entropy. The conditional entropy provides the amount of information needed to explain one random variable (i.e., the at least one sensor) conditioned on known data from the other random variable (i.e., the known sensor). Conditional entropy involving two random variables is provided by the following equation:

$$H(x_1/x_2) = -E_{x_1,x_2}[\log(P(x_1/x_2))] = -\int_{x_1}\int_{x_2} P(x_1, x_2)\log(P(x_1/x_2))dx_1 dx_2$$

Where $P(x_1, x_2)$ is the joint probability density function (PDF) of the two functions, and $P(x_1/x_2)$ is the conditional PDF of $x_1$ given $x_2$.

Joint entropy is defined by the following formula:

$$H(x_1, x_2) = -E_{x_1,x_2}[\log(P(x_1/x_2))] = -\int_{x_1}\int_{x_2} P(x_1, x_2)\log(P(x_1/x_2))dx_1 dx_2$$

Bayes Rule for entropy is defined by the following formula:

$$H(x_1/x_2) = H(x_2/x_1) + H(x_1) - Hx_2$$

Since $$P(x_1/x_2) = \frac{P(x_1, x_2)}{P(x_2)} = \frac{P(x_2/x_1)}{P(x_2)},$$

therefore the following relationship is true:

$$H(x_1/x_2) = -E[\log(P(x_1/x_2))] = -E\left[\log\left[\frac{P(x_2/X_1)P(x-1)}{P(x_2)}\right]\right] =$$
$$-E[\log(P(x_2/x_1))] - E\log(x_1) + E[\log(p(x_2))]$$

The chain rule of entropy is defined by the following formula:

$$H(x_1, x_2, \ldots, x_n) = \sum_{i=1}^{n} H(x_i/x_{i-1}, \ldots, x_1),$$

Introducing mutual information $I(x_1, x_2)$ $$I(x_1, x_2) = E_{x_1,x_2}\left[\log\left(\frac{P(x_1, x_2)}{P(x_1)P(x_1))}\right)\right] = H(x_1) + H(x_2) - H(x_1, x_2)$$

also, $I(x_1,x_2) = I(x_2,x_1) \geq 0$. This is equal to 0 if $x_1$ and $x_2$ are independent, random processes.

Kullback-Leibler (KL) divergence is used to measure the difference between two probability distributions. To find divergence from $P(x_1)$ to $P(x_1/x_2)$, the following formula is used to interpret this divergence measurement as the amount of extra information needed to describe $P(x_1/x_2)$ to use $P(x_1)$, or the information gain when updating the belief from a priori $P(x_1)$ to a posterior $P(x_1/x_2)$, or information gained about $x_1$ when observing $x_2$.

$$D_{KL}(P(x_1/x_2)\|P(x_1)) = \int_{x_1} P(x_1/x_2)\log\frac{P(x_1/x_2)}{P(x_1)}dx$$

Applying information theory to sensor data fusion, recall the following formula:

$$Y(t) = \begin{bmatrix} y_1(t) \\ \vdots \\ y_{nR}(t) \end{bmatrix} \begin{bmatrix} \sum_{j=1}^{N_t} x_j(t) * h_{j,1}(t) + n_1(t) \\ \vdots \\ \sum_{j=1}^{N_t} x_j(t) * h_{j,N_R}(t) + n_{N_R}(t) \end{bmatrix}$$

The known sensor is only $x_1 \ldots x_{Nu1}$. So, the summation of the known sensor data is represented by the following formula:

$$\sum_{j=1}^{N_t} x_j(t) * h_{j,k}(t) = \sum_{j=1}^{N_{u_1}} x_j(t) * h_{j,k}(t) + \sum_{l=n_{u_1}+1}^{N_t} x_l(t) * h_{l,k}(t)$$

Thus, to express the convolution as a vector dot product, the following formula applies:

$x_e(t)^p = [x_e(t), \ldots, x_e(t-p)]$ (a time vector, dims. 1×p) and $h_{i,j}(t)^p = [h_{i,j}(t), \ldots, h_{i,j}(t-p)]$ (a time vector) such that $X_e(t)^p * h_{i,j}(t)^p = h_{i,j}(t)^p \cdot X_e^T(t)^p$ (dot product), so:

$$\sum_{e=1}^{N_{u_1}} X_e(t) * h_{j,k}(t) = \begin{bmatrix} h_{1,k}(t)^p & h_{2,k}(t)^p & \ldots & h_{N_{u_1},k}(t)^p \end{bmatrix} \begin{bmatrix} X_1^T(t)^p \\ \vdots \\ X_{N_{u_1}}^T(t)^p \end{bmatrix}$$

Therefore, Y(t):

$$\begin{bmatrix} y_1(t) \\ \vdots \\ y_{nR}(t) \end{bmatrix} = \begin{bmatrix} h_{11}(t)^p & h_{12}(t)^p & \ldots h_{1,n_t}(t)^p \\ \vdots & & \\ h_{n_R,1}(t)^p & \ldots & \ldots & h_{n_1 n_t}(t)^p \end{bmatrix} \begin{bmatrix} x_1(t)^p \\ \vdots \\ y_{n_t}(t)^p \end{bmatrix} + \begin{bmatrix} N_1(t) \\ \vdots \\ N_R(t) \end{bmatrix}$$

So $Y(t) = H^p X^p(t) + N(t)$, where $H^p$ can decompose as $$H^p = \begin{bmatrix} H^p_{N_R \times N^p_{u_1}} & | & H^p_{N_R \times P(N_t - N_{u_1})} \end{bmatrix}$$

where the first matrix is the known sensor data $N_R$, and the second matrix is the at least one sensor (i.e., a new sensor).

Now, considering mutual information I(Y, X) and the conditional entropy H(Y/X) defined by the following formulas: H(Y/X)

$$H(Y, X) = H\left(Y / [x_1, x_2, \ldots, x_{N_{u_1}} / x_{N_{u_1}+1}, \ldots, x_{N_t}]\right) + H\left([x_1, x_2, \ldots, x_{N_{u_1}} / x_{N_{u_1}+1}, \ldots, x_{N_t}]\right) \text{ and, } I(Y, X) =$$

$$H(X) - H\left(\frac{X}{Y}\right) = H(Y) - H(Y, X) + H\left(x_1, \ldots, x_{N_{u_1}} / x_{N_{u_1}+1}, \ldots, x_{N_t}\right)$$

where $H\left((x_1, \ldots, x_{N_{u_1}} / x_{N_{u_1}+1}, \ldots, x_{N_t})\right)$ is the extra information the at least one sensor gives to Y about $x_1 \ldots x_{Nu1}$ for the known sensor.

By the definition of Conditional Entropy:

$$\left(H\left(x_1 \ldots x_{n_{u_1}} / x_{n_{u_1}+1} \ldots x_{n_t}\right) = \int_{x_1} \ldots \int_{x_{n_t}} P\left(x_1 \ldots x_{n_{u_1}} / x_{n_{u_1}+1} \ldots x_{n_t}\right) \log\left[P\left(x_1 \ldots x_{n_{u_1}} / x_{n_{u_1}+1} \ldots x_{n_t}\right)\right] dx_1 \ldots dx_{n_t}\right)$$

This conditional entropy represents the extra information that other (i.e., new) sensors give to improve the classification and detection of signals associated with the known sensor.

Generally, conditional entropy is a mathematical measurement of uncertainty remaining about a random variable (i.e., new sensor data) given that the value of a second random variable (i.e., known sensor data) is already known. Essentially, conditional entropy provides a numerical value about how much information about the random variable is unknown even if the system knows the value of the second random variable. Therefore, linking curated sensor data involves calculating the conditional entropy between the new sensor data and the known sensor data. The threshold for no link, weak link, and strong link is use case dependent.

So, the system links data depending in part on the conditional entropy. Provided the new sensor data and the known sensor data are strongly linked, the system then fuses the new senor data and the known sensor data.

Sensor data fusion takes the at least one sensor data and the known sensor data and fuses the sensor data together, creating a new data set, based on what sensor data properties are relevant to the query received by the system from the user and/or computer. In one embodiment, the system is operable to fuse only common properties and/or sub-properties. In another embodiment, the system is operable to fuse all sensor data so long as at least two sensors include at least one strongly linked common property and/or sub-property.

For example, in an embodiment where the system fuses only common properties and/or sub-properties, the system receives a query from a user interested in a radio frequency (RF) environment to determine a bandwidth of a certain signal. If the linked sensor data includes sensor data from at least two sensors that includes strongly linked signal modulation and strongly linked bandwidth properties, only the strongly linked sensor data for the bandwidth properties are fused, and the system does not fuse the signal modulation properties because this sensor data is irrelevant based on the query received by the system from the user.

As another example, in an embodiment where the system fuses all sensor data so long as at least two sensors include at least one common property and/or sub-property, the system receives a query from a user interested in an RF environment to determine bandwidth of a certain signal. If a first sensor creates a measurement from bandwidth and signal modulation, and a second sensor creates a measurement from bandwidth and signal-to-noise ratio, the system is operable to fuse the bandwidth (assuming strong linking), signal modulation, and signal-to-noise ratio, despite only one common property. This creates a wider breadth of data and more accurate information for the overlapping properties.

In one embodiment, the new data set resulting from the sensor data fusion includes a sensor accuracy value for the at least one sensor data source and/or the known sensor data source. In another embodiment, the new data set includes a prediction about an upcoming event based at least in part on the sensor data from the at least one sensor, the known sensor data, and/or the user defined conclusion/query received by the system.

After the sensor data fusion occurs, the system is operable to create an inference based in part on receiving the query and/or hypothesis from the user and/or computer. Preferably, the system utilizes and artificial intelligence engine to create an inference from the fused sensor data. In one embodiment, the inference is a mathematical output. In one embodiment, an inference includes a prediction as to the accuracy of a sensor reading. In another embodiment, an inference includes a prediction of a future event based in part on the fused sensor data. After the system creates an inference, the system automatically validates the inference.

Data validation is a statistical calculation that the inference is accurate. The data validation step is operable to occur passively or actively. In one embodiment, active data validation includes changing the environment in which the at least one sensor and the known sensor are creating measurements from such that the sensor data life cycle starts over with different sensor data. The sensor data life cycle runs again, and the system validates the inference by creating a statistical comparison between the original inference and a new inference. If the comparison exceeds a predefined threshold or user and/or application defined threshold, the inference is deemed validated. If the comparison does not exceed a predefined threshold, the inference is deemed invalid.

In one embodiment, passive validation includes not changing the environment in which the at least one sensor and the known sensor are creating measurements from such that the sensor data life cycle continues to collect sensor data on the existing environment. The sensor data life cycle runs again, and the system validates the inference by creating a statistical comparison between the original inference and a new inference. If the comparison exceeds a predefined threshold or user and/or application defined threshold, the inference is deemed validated. If the comparison does not exceed a predefined threshold, the inference is deemed invalid.

Optionally, once the system determines that an inference is valid, the fused sensor data, including the new data set, and the inference are stored. In one embodiment, the system does not store any sensor data unless the sensor data has been validated. In another embodiment, the system stores validated sensor data and sensor data with at least one property and/or sub-property in common. For example, if a first sensor detects ten properties, and a second sensor detects one property in common with the first sensor and nine properties different from the first sensor, the system is operable to store all twenty properties, despite only one common property. In one embodiment based on an application of a user goal, at least one common property is averaged and/or assigned a confidence level based on correlation between multiple data sources.

Preferably, the sensor data fusion system and methods incorporate data provenance (e.g., a data filter), which enables the system to trace back and identify instances where a particular sensor data element might have been misinterpreted or malfunctioning. This feature allows the system to unwind the fusion, linking, and/or curation process, correcting errors and ensuring accuracy. This allows for the ability to separate or disregard sensor data sources in the case the sensor data source turns out to be inaccurate and/or misrepresenting or biasing the sensor data. The system must pass the data through a series of filters to validate the task or hypothesis. This filtering process involves assessing whether the sensor data captured from the at least one sensor is sufficient, diverse, and representative of an environmental sampling rate.

Another critical filter addresses the proper labeling of sensor data, which is particularly important when dealing with complex sensor data. Each data set must be correctly labeled, including all associated properties and/or sub-properties, to ensure accurate fusion and subsequent analysis. The correct and present labeling and curating of sensor data ensures the analysis that eventually takes place is correctly interpreting cohesive sensor data from all data sources.

As previously described, in one embodiment, the system is operable to incorporate Artificial Intelligence (AI) and Machine Learning (ML) to enhance sensor data fusion and analysis. The AI/ML engine is operable to learn patterns from known sensor data, enabling it to predict and adjust for potential biases or inaccuracies in real-time. This dynamic adjustment allows the system to continuously refine its sensor data fusion process, thereby increasing the reliability of the information produced. The AI/ML engine automates the validation process by comparing incoming data against established models and making adjustments as necessary such as removing outliers from the data, removing data sources, and/or flagging a faulty sensor and/or analysis method.

The AI/ML engine is designed to handle both curated data and raw sensor data from the at least one sensor and the known sensor data, where the system helps curate and organize the sensor data before the fusion process happens, providing flexibility in processing different types of sensor data. In another embodiment, AI/ML algorithm is operable to detect anomalies in the sensor data that could indicate sensor malfunctions or other issues, allowing for early intervention and correction. The AI/ML engine prioritizes data sources based on their historical accuracy and reliability, dynamically adjusting the weight assigned to each source during the fusion process.

In one embodiment, the AI/ML engine includes a feedback loop mechanism, where the outcomes of previous analyses are fed back into the system to continuously improve its accuracy. This self-learning capability allows the system to adapt to changing conditions, such as new types of data sources or evolving environmental factors, ensuring that it remains effective over time. The feedback loop works to fine-tune the dynamic adjustment threshold for validation, adjusting it based on the system's operational history and current data trends.

In another embodiment, the system is operable to perform adaptive data compression, where AI/ML algorithms determine the most relevant sensor data to store based in part on the specific user/computer query received by the system. This adaptive compression is able to be applied both at the edge and on a central server, optimizing storage and transmission while maintaining quality of the sensor data used for analysis.

Advantageously, in one embodiment, the system is operable to enhance zero-trust data principles using AI/ML, where each sensor data source and fusion is continuously validated against a dynamic model that reflects the current state of the electromagnetic environment and assigned a confidence interval and/or reliability score. This model is regularly updated using machine learning techniques, ensuring that the system's understanding of what constitutes trustworthy data evolves over time as information changes.

Conversely, in another embodiment, the system is operable to not incorporate AI/ML. In this embodiment, the system operates using a preprogrammed decision tree.

Figure 1B:
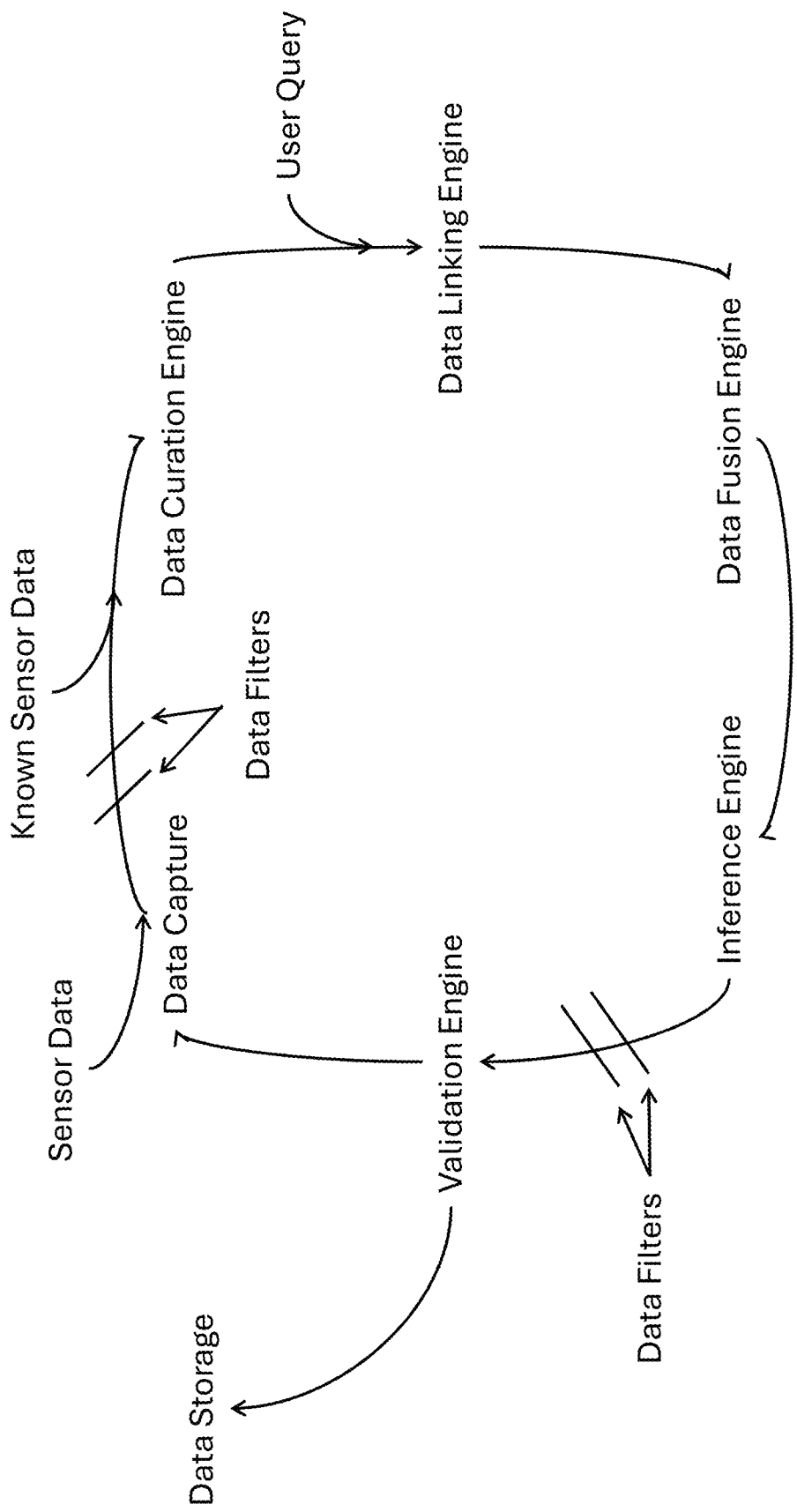
FIG. 1B illustrates a data lifecycle according to another embodiment of the present invention.

In another embodiment, depicted in FIG. 1B, a computer processor includes separate engines for each step in a sensor data lifecycle. In this embodiment, a data curation engine is operable to curate sensor data, a data linking engine is operable to link the sensor data, a data fusion engine is operable to fuse the sensor data, an inference engine is operable to determine an inference from the sensor data and/or fused data, and a validation engine is operable to validate the sensor data and/or the fused data. Each engine is operable to include functionality to complete each step in the sensor data lifecycle depending in part on field of use.

Robotics

Sensor data fusion for robotics is applicable to be applied to aid robots in performing functions. The functions are able to be as simple as a robot operating along an assembly line, or as complex as a collaborative robot assisting a doctor during a surgical operation. In one embodiment, the robot includes at least two sensors. In another embodiment, the system is operable to fuse sensor data from at least one sensor included in the robot and at least one sensor not in the robot. The present invention is operable to increase the accuracy and productivity of a robot.

Figure 2:
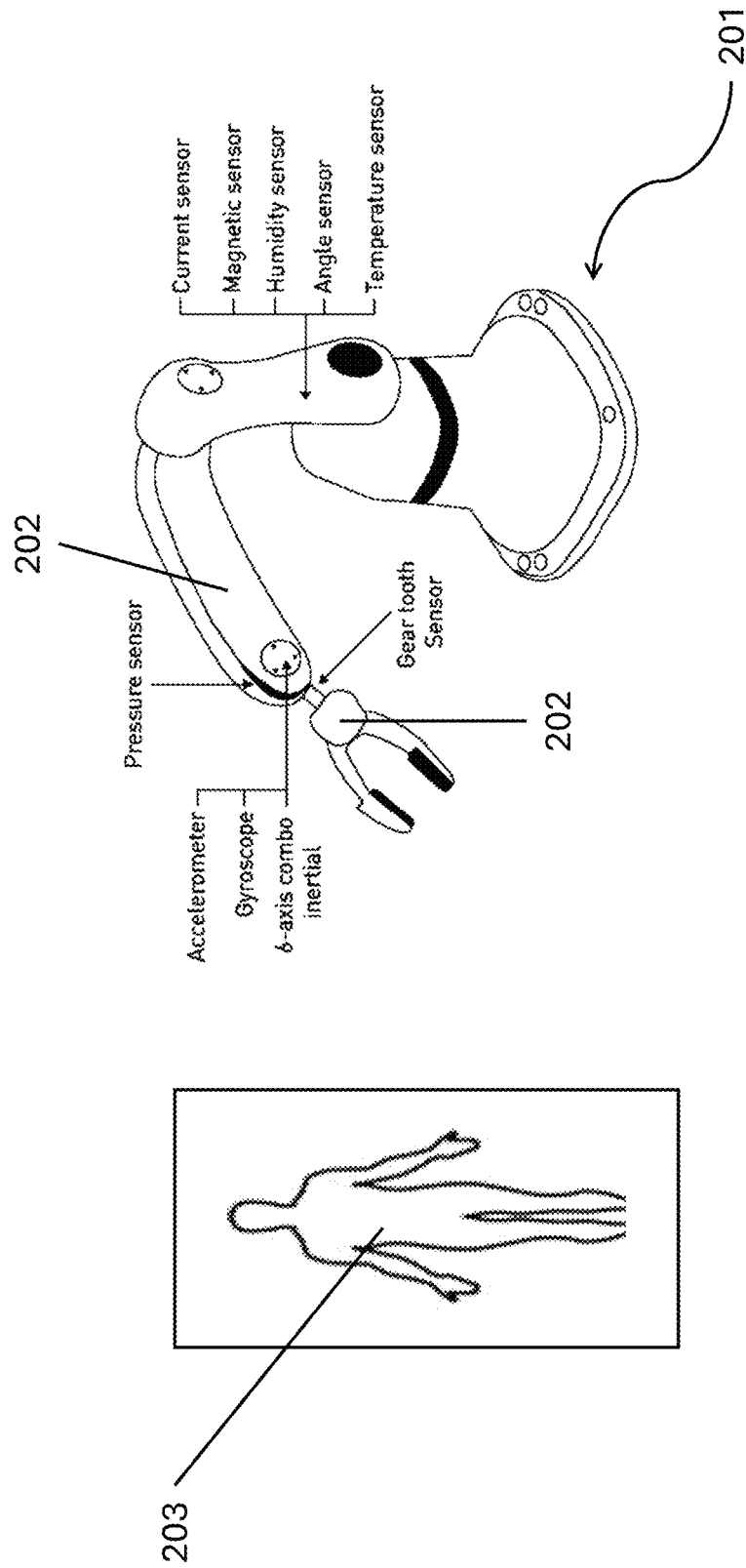
FIG. 2 illustrates robotics sensor data fusion according to one embodiment of the present invention.

FIG. 2 illustrates sensor data fusion for a surgical robot 201 according to one embodiment of the present invention. In one embodiment, the surgical robot 201 includes at least two sensors. In one embodiment, the surgical robot 201 includes an accelerometer, a gyroscope, a force/torque sensor, a proximity sensor, a gear sensor, a magnetic field sensor, a humidity sensor, an angle sensor, a temperature sensor, a 6-axis combo inertial sensor, a current sensor, a pressure sensor, and/or any other sensor used in robotics.

The accelerometer is used to measure acceleration, tilt, and position of a robotic component 202. The accelerometer is operable to create a measurement from changes in the speed and orientation of the robotic component 202, which allows the system to monitor movement and balance of the surgical robot 202. To calculate the tilt of the robotic component 202, the accelerometer measures the force of gravity acting along different axes. Essentially, the accelerometer calculates the angle of inclination of the robotic component 202 by calculating/comparing the measured acceleration to the known acceleration due to gravity. The gravity vector is projected differently on the accelerometer's axes, enabling the accelerometer to calculate different tilt angles in each plane of the robotic component 202. As such, in one embodiment, the system curates the accelerometer sensor data into an acceleration property of the robotic component 202 and a sub-property of tilt and position of the robotic component 202.

The gyroscope sensor is used to measure rotation and changes in orientation of the robotic component 202. To calculate rotation, the gyroscope measures an angular velocity around its axis, based on the principle of conservation of angular momentum, because an internal component in the gyroscope sensor is spinning. When the component within the gyroscope sensor undergoes torque, the internal component in the gyroscope sensor responds by precessing, the precessing being measured and interpreted as a change in orientation, allowing the gyroscope sensor to calculate the rotation and orientation changes of the robotic component 202 in real-time. As such, in one embodiment, the system curates the gyroscope sensor data into an angular velocity property of the robotic component 202 and a sub-property of orientation of the robotic component 202.

The force/torque sensor is used to measure the amount of force being applied by the robotic component 202. In the embodiment depicted in FIG. 2, the force/torque sensor provides a surgeon with a sense of touch by translating the force the robotic component 202 is applying to the patient into a measurable signal. To calculate force, the force/torque sensor calculates the magnitude and direction of force applied by the robotic component 202 during an interaction by the robot 201 with its environment. The force sensor calculates force using mass multiplied by acceleration and measures force and/or torque directly via strain gauges or similar methods. As such, in one embodiment, the system curates the force/torque sensor data into a force property of the robotic component 202 and a sub-property of mass and a sub-property of acceleration of the robotic component 202.

The proximity sensor is used to measure the presence of objects without the need for physical contact. The proximity sensor, in one embodiment, includes infrared, ultrasonic, and/or capacitive sensors. To measure the presence of objects, the proximity sensor emits signals and receives changes in the emitted signals. Based on the received signals, the proximity sensor creates a measurement from the distance between the robotic component 202 and an object. Based on the distance between the robotic component 202 and the object, the proximity sensor is operable to determine an orientation of the robotic component 202 to the object. As such, in one embodiment, the system, curates the proximity sensor data into a distance from the object to the robotic component 202 property and an orientation of the robotic component 202 sub-property.

The gear sensor is used to measure a strain on a gearbox the by the robotic component 202 within the surgical robot 201. The gear sensor measures the torque outputted during the movement of the robotic component 202 on each joint of the surgical robot 201. As such, in one embodiment, the system is operable to curate the gear sensor data into a property of torque of the robotic component 202 on other joints of the surgical robot 201 and a sub-property of a location of the robotic component 202 based on gear position.

The magnetic sensor (i.e., the magnetic field sensor) is used to determine a precise position and orientation of the robotic component 202. In the embodiment depicted in FIG. 2, the magnetic sensor is operable to determine a position of a surgical instrument within a patient's body 203. To calculate the position of the robotic component 202, the magnetic sensor creates a measurement from changes in magnetic field strength, where a change in the magnetic field around the magnetic sensor generates a voltage proportional to the field strength, allowing the magnetic sensor to calculate position, proximity, and/or orientation of the robotic component 202. As such, in one embodiment, the system is operable to curate the magnetic sensor data into a property of magnetic field strength of the robotic component 202 and a sub-property of position, proximity, and/or orientation of the robotic component 202.

The humidity sensor is used to measure changes in moisture levels. In the embodiment depicted in FIG. 2, the humidity sensor is important for determining tissue integrity, performance of the surgical robot 201, and environmental control. To calculate humidity, in one embodiment, the humidity sensor uses a capacitive principle, where a hygroscopic material is placed between two electrodes. The hygroscopic material changes its capacitance depending on surrounding humidity (and therefore liquid present on the hygroscopic material). The more liquid the hygroscopic material absorbs, the greater the capacitance, allowing the humidity sensor to measure relative humidity by creating a measurement from changes in the electrical capacitance. As such, in one embodiment, the system is operable to curate the humidity sensor data into a property of humidity of an environment around the robotic component 202.

The angle sensor is used to measure a rotational position of the robotic component 202. The angle sensor creates a measurement from changes in a magnetic field created by a rotating component, often a motor shaft, which is then translated into an electrical signal representing the precise angular position of the robotic component 202. The angle sensor determines the rotational position of the robotic component 202 and the orientation of the robotic component 202. As such, in one embodiment, the system is operable to curate the angle sensor data into a property of the rotational position of the robotic component 202 and a sub-property of the orientation of the robotic component 202.

The temperature sensor is used to create a measurement from environment temperature and/or a temperature of the surgical robot 201. To create a measurement from temperature changes, the temperature sensor uses a thermocouple, which alters the electrical resistance based on environment temperatures and/or internal temperatures. As such, in one embodiment, the system is operable to curate the temperature sensor data into a property of temperature of the surgical robot 201.

Importantly, the aforementioned robotic sensor data curation examples are curated with known data. In the embodiment depicted in FIG. 2, known sensor data includes sensor data from the accelerometer, the gyroscope, the force/torque sensor, the proximity sensor, the gear sensor, the magnetic sensor, the humidity sensor, the angle sensor, and/or the temperature sensor.

In the embodiment depicted in FIG. 2, the system is operable to receive a query from a surgeon operating the surgical robot 201 via a controller. In this embodiment, the query received by the system includes the surgeon adjusting the robotic component 202 (i.e., an arm, surgical tool, etc.) to an appropriate position. The system of the present invention, in one embodiment, must assess which sensor data is sufficiently linked to accurately move the robotic component 202 to the desired position. In doing so, the system uses curated known sensor data and curated new sensor data to perform sensor data linking based on the query received by the system. In another embodiment, the surgical robot 201 is programmed with a query (i.e., the surgical robot 201 is preprogrammed with safety measures to never apply more than 5 pound-force per square inch (PSI) to a patient). In this embodiment, the system uses the curated known sensor data and the curated new sensor data to perform sensor data linking to ensure the surgical robot 201 does not exceed a safety threshold.

After the surgical robot 201 sensor data is curated, the system is operable to receive a query. As an example, in one embodiment, where the query received by the system includes the surgeon adjusting the robotic component 202, new sensor data is able to include the gyroscope, the force/torque sensor, the proximity sensor, the gear sensor, the accelerometer, the angle sensor and/or any other sensor used in robotics, and known sensor data is able to include the magnetic field sensor. In another embodiment, the system is operable to include any sensor for the new sensor data and any sensor for the known sensor data. For the purpose of this example, the magnetic field sensor is the known sensor data, and the accelerometer is the new sensor data. An illustration calculation for these sensors is included because the magnetic field sensor is operable to determine change in magnetic field strength surrounding the robotic component 202 and the sub-property of the position of the robotic component 202, and the accelerometer is operable to determine the acceleration property of the robotic component 202, and the position sub-property of the robotic component 202. The position of the robotic component 202 measured by the magnetic field sensor is operable to be linked to the position of the robotic component 202 measured by the accelerometer depending on the calculations performed by the system. The known sensor data is curated by the change in magnetic field of the robotic component 202 property. In one embodiment, the change in magnetic field strength property is measured in the following three ways: a decrease in magnetic field strength, no change in magnetic field strength, or an increase in magnetic field strength. The new sensor data is curated by the acceleration property. In one embodiment, the acceleration property is measured in the following three ways: a decrease in acceleration, no change in acceleration, or an increase in acceleration.

After the system receives the query, the system begins to link the sensor data. To link the sensor data, the measurement of each curated sensor data property determines if the sensor data from two or more sensors will be linked either by each property and/or sub property. For example, the conditional entropy calculation is used to calculate the link between the magnetic field sensor and the accelerometer is determined by the magnetic field strength property measuring an increase in magnetic field strength, no change, or an increase in magnetic field strength. To explain further, the known magnetic field sensor data property undergoes a conditional entropy calculation to determine if the magnetic field sensor includes a strong link, weak link, or no link to the accelerometer based on the relationship between the magnetic field strength sensor data property (and robotic component 202 position sub-property) and the recorded accelerometer acceleration property (and robotic component 202 position sub-property). Put simply, the linking equation determines how correlated the magnetic field strength measured by the magnetic field sensor is to the acceleration measured by the accelerometer (and how correlated the position sub-properties are), thereby creating a mathematical relationship for the correlation between the magnetic field sensor and the accelerometer.

Since the user query received by the system is to move the robotic component 202, data linking calculates whether the correlation between the magnetic field sensor and the accelerometer is linked if the calculated linking value is determined to be above a mathematical threshold to fuse the sensor data to help provide information regarding sensor accuracy for the position of the robotic component 202.

In this example, the magnetic field sensor records a property of magnetic field strength fluctuations over a period of time (i.e., a data collection period). In doing so, the magnetic field sensor records a plurality of data points over the collection period. The artificial intelligence engine is operable to generate a function that accurately represents the plurality of data points over the data collection period the magnetic field sensor recorded. The artificial intelligence engine then averages the amount of time the magnetic field sensor recorded a decrease, static, and/or increase in magnetic field strength over the data collection period.

Similarly, the accelerometer provides a property of acceleration fluctuations over the same data collection period the magnetic field sensor recorded fluctuations in magnetic strength. In doing so, the accelerometer records a plurality of data points over the data collection period. The artificial intelligence engine is operable to generate a function that accurately represents the plurality of data points over the data collection period the accelerometer recorded. The artificial intelligence engine then averages the amount of time the accelerometer recorded a decrease, static, and/or increase in acceleration over the data collected period.

In one example, the query received by the system is to move the robotic component 202.

The artificial intelligence engine is operable to curate each measurement from the magnetic field sensor that the magnetic field strength was decreasing, static, and/or increasing. Simultaneously, the AI engine is further operable to curate each measurement from the accelerometer that the acceleration was decreasing, static, and/or increasing. Using the magnetic field sensor data and the accelerometer sensor data, the AI engine calculates how much time over the data collection period that each measurement from the magnetic field sensor corresponds to each measurement from the accelerometer.

For example, the system averages the amount of time the magnetic field sensor and the accelerometer simultaneously measured decreasing, static, and/or increasing measurements. The system summarizes the collected data in a table. Each numerical value in the table represents an amount of time within the data collection period that each sensor measured the corresponding fluctuation. For example, 0.3 in the "Acceleration Increasing" column and "Magnetic Field Strength Increasing" row represents 0.3 seconds in the sensor data over the data collection period that both the accelerometer and the magnetic field sensor recorded increases in magnetic field strength and increases in acceleration simultaneously.

In this example, measurements for the magnetic field property detected by the magnetic sensor are magnetic field strength decreasing, magnetic field strength static (i.e., no change), and magnetic field strength increasing. The measurements for the acceleration property detected by the accelerometer are acceleration decreasing, acceleration static (i.e., no change), and acceleration increasing.

The system completes the collected data summary for each property, which is summarized below.

|  | Acceleration Decreasing | Acceleration Static | Acceleration Increasing |
|---|---|---|---|
| Magnetic Field Strength Decreasing | 0.2 | 0.1 | 0.2 |
| Magnetic Field Strength Static | 0.1 | 0.2 | 0.1 |
| Magnetic Field Strength Increasing | 0.2 | 0.1 | 0.3 |

The larger the value, the more likely that sensor measurement is correlated to the new sensor data before the linking calculation is complete. In this example, 0.3 in the "Acceleration Increasing" column and the "Magnetic Field Strength Increasing" row represents the amount of time, in seconds, that both the magnetic field strength is increasing, and the acceleration is increasing. As such, the magnetic field sensor is likely most correlated to an increase an acceleration (as such, the position sub-property determined by the magnetic field sensor is correlated to the position sub-property determined by the accelerometer).

Using the joint probability distribution table, the system is operable to calculate the conditional probability (P(Y|X)), where X is magnetic field sensor data and Y is accelerometer data. In this case, the conditional probability calculates the probability that the changes in the magnetic field strength are correlated to Acceleration Decreasing, Acceleration Static, and Acceleration Increasing. The system calculates the conditional probability as follows: P(Acceleration Decreasing|Magnetic Field Strength Decreasing)=0.2/(0.2+0.1+0.2)=0.4. As another example, P(Acceleration Decreasing|Magnetic Field Strength Increasing)=0.2/(0.2+0.1+0.3)=0.33 This calculation is completed for each P(Y|X). A summary of the completed calculations is below.

|  | Acceleration Decreasing | Acceleration Static | Acceleration Increasing |
|---|---|---|---|
| Magnetic Field Strength Decreasing | 0.4 | 0.2 | 0.4 |
| Magnetic Field Strength Static | 0.25 | 0.5 | 0.25 |
| Magnetic Field Strength Increasing | 0.33 | 0.167 | 0.5 |

Using the recorded data, the system is operable to calculate the probability that the magnetic field sensor measures changes (i.e., fluctuations) in the magnetic field strength over the data collection period. In this example, the collected data over the data collection period calculated that the magnetic field sensor is 30% likely to record decreasing magnetic field strength, 20% likely to record net zero changes (i.e., static measurements), and 50% to record increasing magnetic field strength.

Using the conditional probability P(Y|X), the system then calculates the joint probability matrix P(X,Y). The joint probability matrix includes the conditional probability matrix P(Y|X) multiplied by the probability that that the magnetic field sensor measures changes in the magnetic field strength. The probabilities of magnetic field strength changes are converted into a vector $p(x1)$, $p(x2)$, and $p(x3)$. In this case, <0.3, 0.2, 0.5>. Each value is multiplied by the corresponding row such that each Magnetic Field Strength Decreasing value is multiplied by 0.3, each Magnetic Field Strength Static value is multiplied by 0.2, and each Magnetic Field Strength Increasing value is multiplied by 0.5. A summary of the completed joint probability matrix P(X,Y) is included below.

|  | Acceleration Decreasing | Acceleration Static | Acceleration Increasing |
|---|---|---|---|
| Magnetic Field Strength Decreasing | 0.12 | 0.06 | 0.12 |
| Magnetic Field Strength Static | 0.05 | 0.1 | 0.05 |
| Magnetic Field Strength Increasing | 0.165 | 0.0832 | 0.25 |

Using the joint probability matrix P(X,Y), the system is operable to calculate probabilities for each measured magnetic field strength change by summing each column of the joint probability matrix P(X,Y). In this example, probability $p(y1)$ equals the sum of all values in the Acceleration Decreasing column, probability $p(y2)$ equals the sum of all values in the Acceleration Static column, and probability $p(y3)$ equals the sum of all values in the Acceleration Increasing column. As such, $p(y1)=0.335$, $p(y2)=0.2432$, and $p(y3)=0.42$.

Using the $p(y1)$, $p(y2)$, and $p(y3)$ values, the system is operable to calculate the conditional probability matrix P(X|Y) by dividing each column of the joint probability matrix P(X,Y) by $p(y1)$, $p(y2)$, and $p(y3)$. For example, each value in the Acceleration Decreasing Column of the joint probability matrix is divided by $p(y1)$. In this case, P(Magnetic Field Strength Decreasing|Acceleration Decreasing)=0.12/0.335=0.358. The system calculates the P(X|Y) for all values. A summary of the calculation is included below.

|  | Acceleration Decreasing | Acceleration Static | Acceleration Increasing |
|---|---|---|---|
| Magnetic Field Strength Decreasing | 0.358 | 0.247 | 0.286 |
| Magnetic Field Strength Static | 0.15 | 0.411 | 0.119 |
| Magnetic Field Strength Increasing | 0.492 | 0.342 | 0.595 |

Finally, the system is able to complete a conditional entropy calculation to determine the association between the magnetic field sensor and the accelerometer. To do so, the system is operable uses the joint matrix probability P(X,Y), the conditional probability matrix P(X|Y), and the conditional entropy equation H(X|Y) disclosed herein. For this example, H(X|Y)=−[0.12 log (0.358)+0.06 log (0.247)+0.12 log (0.286)+0.05 log (0.15)+0.1 log (0.411)+0.05 log (0.119)+0.165 log (0.492)+0.0832 log (0.342)+0.25 log (0.595)]=0.427.

The closer the conditional entropy value is to zero, the stronger the link between the sensor data because a value of 0 for conditional entropy is interpreted as no additional information is needed from one sensor to fully predict, with 100% accuracy, the readings of another sensor. For robotics, a mathematical threshold for a weak data link is represented by a conditional entropy between 0.45 and 0.99. A mathematical threshold for a strong link is represented by a conditional entropy between 0.44 and zero. The threshold limit for each linking category is operable to be user generated, application dependent, and/or dynamically adjusted by an AI model based on output or feedback. In this example, the system determines that the conditional entropy measurement for the magnetic field sensor and the accelerometer is within the mathematical threshold to constitute a strong link. Therefore, the system begins to fuse sensor data obtained from the magnetic field sensor and the accelerometer.

The system conducts sensor data fusion that is operable to produce new information. In the present example, the query received by the system is to adjust the robotic component 202. In doing so, fusing the known position of the robotic component 202 (via the sub-property) based on the magnetic field sensor with the new sensor measurements from the accelerometer creates a new set of data. The sensor data fusion process creates at least an accuracy value of the accelerometer. In one embodiment, if the accelerometer measures a different position of the robotic component 202 than the magnetic field sensor, the system is operable to highlight discrepancies in the data and recommend which sensor reading is more accurate. Therefore, a final product of the sensor data fusion includes a sensor reading from the magnetic field sensor, a sensor reading from the accelerometer, and at least one new data point. In one embodiment, the system is operable to include a plurality of new data points.

In one embodiment, the system only fuses sensor data including a common property and/or sub-property. In this example, the system would only fuse the position data and not the magnetic field strength and acceleration data. In another embodiment, the system fuses all data measured by each sensor, including similar and dissimilar properties and/or sub-properties. In this example, the system would fuse the position, the change in magnetic field strength, and the acceleration.

Once the at least one new data point is created, the system is operable to draw at least one inference based in part on the fused data. To further elaborate on this example, the sensor data fusion occurs based in part on the query received by the system. Since the query received by the system is to move the robotic component 202, the at least one new data point is operable to include which sensor more accurately measures the position of the robotic component 202, if the readings are different. In one embodiment, the system is operable to infer which sensor data the surgical robot 201 uses to abide by the query received by the system and create a subsequent inference about why the magnetic field sensor and the accelerometer readings measured a different position of the robotic component 202 (i.e., damaged internal components, faulty wiring, sensor misplacement, etc.). In another embodiment, the inference is operable to include a determination of the exact position of the robotic component 202 (i.e., calculate an answer to the query received by the system). Once the system generates at least one inference, the system undergoes a validation phase to ensure the accuracy of the sensor data fusion.

The validation occurs passively and/or actively. For both validation methods, the system must complete a first round (i.e., the robotics example described herein) and a second round (repeating the steps demonstrated in the robotics example described herein with new data) of data collection, data curation, data fusion, and data inferencing using the same new sensor and the same known sensor. At the completion of the second round of data collection, data curation, data fusion, and data inferencing, the mathematical output of the first round is compared to the mathematical output of the second round. The system validates the sensor data fusion if the mathematical outputs are within about 4.5% or within 4.5% of each other.

In one embodiment, the validation occurs actively. Active validation for robotics is able to include the surgical robot 201 modifying an acceleration that the system used to fuse the sensor data. In this case, active validation includes the surgical robot 201 changing the acceleration of the robotic component 202 to calculate how the magnetic field sensor and the accelerometer measure the change. The system measures the change in the magnetic field strength via the second round of data collection, data curation, data fusion, and data inferencing using the magnetic field sensor and the accelerometer.

In one embodiment, the validation occurs passively. Passive validation for robotics includes the surgical robot 201 not modifying any parameter that the system measured to fuse the data. In this case, passive validation includes the system continuously collecting data on the change in magnetic field strength of the robotic component 202 via the magnetic field sensor. The system measures the magnetic field strength change of the robotic component 202 via the second round of data collection, data curation, data fusion, and data inferencing using the magnetic field sensor and the accelerometer.

In this example, the system validates the data passively and concludes that the magnetic field sensor and the accelerometer are sufficiently correlated such that the systems data fusion is reliable and accurate.

Notably, the robotics example described herein is just one of the calculations performed by the system. However, the example is intended only to illustrate one of the plurality of calculations the system is conducting simultaneously, in real-time. The system processes a vast number of sensor readings, data curation, matrix mathematical calculations, and logarithmic computations in real-time, of which the human mind cannot practically perform.

Autonomous Transportation

Sensor data fusion for autonomous transportation is applicable to be applied to any vehicle operating without human interaction. In one embodiment, an autonomous vehicle includes at least two sensors. In another embodiment, the system is operable to fuse sensor data from an autonomous vehicle including at least one sensor and at least one sensor not in or on the autonomous vehicle. The present invention is operable to increase accuracy of navigation and vehicle control on any vehicle that operates without human interaction.

Figure 3:
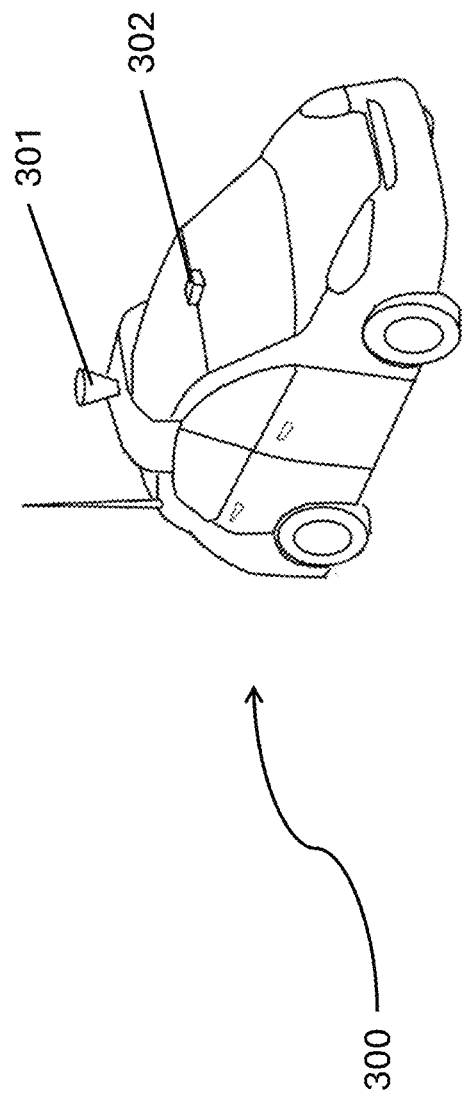
FIG. 3 illustrates autonomous transportation sensor data fusion according to one embodiment of the present invention.

FIG. 3 illustrates sensor data fusion in an autonomous vehicle 300 according to one embodiment of the present invention. The autonomous vehicle 300 includes at least two sensors. In one embodiment, the autonomous vehicle 300 includes a LiDAR sensor 301, radar sensor 302, ultrasonic sensor, visible spectrum camera, GPS sensor, inertial measurement unit, infrared sensor (i.e., infrared camera), depth camera, load sensor, and/or any other sensor used in autonomous transportation.

The LiDAR sensor 301 is used to create a three-dimensional (3D) map of an autonomous vehicle's surroundings. Generally, LiDAR sensors are useful for detecting small objects with great precision, but weather and other external factors decrease the accuracy of the LiDAR sensor 301 data. The LiDAR sensor 301 is operable to emit millions of laser pulses each second and receive reflected pulses. The LiDAR sensor 301 determines the travel time it takes the laser light to leave the LiDAR sensor 301 and return to the LiDAR sensor 301 after reflecting off an object. The LiDAR sensor 301 uses the known speed of light to determine the distance the object is from the LiDAR sensor 301. A processor uses the laser light information to create a point cloud, which is a dense 3D visualization of the environment around the LiDAR sensor 301. As such, in one embodiment, the system curates the LiDAR sensor 301 data into a 3D model of the environment property and a sub-property of the distance from the autonomous vehicle 300 to a specific object.

The radar sensor 302 emits radio waves and creates a measurement from an object in an environment of the autonomous vehicle 300. To create a measurement from the objects, the radar sensor 302 emits short pulses of radio waves in a focused beam. A receiver on the radar sensor 302 receives a radio wave reflected from the object. The radar sensor 302 uses the time it takes for the emitted pulse of radio waves to return to the radar sensor 302. Using a phase shift between transmitted and reflected signals, the radar sensor 302 is operable to calculate a velocity of the object. As such, in one embodiment, the system curates radar sensor 302 data into the property of the location of the object, and a sub-property of the velocity of the object.

The ultrasonic sensor is used to create a measurement from objects surrounding the autonomous vehicle 300. The ultrasonic sensor emits a sound wave that reflects off an object and the ultrasonic sensor receives the reflected sound wave to determine the position of the object. As such, in one embodiment, the system curates the ultrasonic sensor data into the property of the location of the object.

The visible spectrum camera is used to show a 360-degree field of view around the autonomous vehicle 300. A visible spectrum camera/sensor records an environment surrounding the autonomous vehicle 300 up to 820 feet away from the autonomous vehicle 300. Often paired with a computer processor, the camera sensor is operable to calculate distance to the object and visibility of the environment, such as impediments on other sensors. As such, in one embodiment, the system is operable to curate the visible spectrum camera data into a property of the distance to the object and a sub-property of sensor impediments.

The GPS sensor is used to determine a position of the autonomous vehicle 300. Satellites transmit real-time location data to the GPS sensor in the autonomous vehicle 300. The autonomous vehicle 300 uses the satellite data to determine position, destination, and the optimal route for the autonomous vehicle 300 to travel. As such, in one embodiment, the system is operable to curate the GPS sensor data into a property of position of the autonomous vehicle 300, and the sub-properties of a destination and optimal route of the autonomous vehicle 300.

The inertial measurement unit measures an acceleration, orientation, and angular rate of the autonomous vehicle 300. The inertial measurement unit uses a combination of accelerometers, gyroscopes, and magnetometers to determine cardinal direction of the autonomous vehicle 300. In one embodiment, the system operates within the inertial measurement unit to fuse sensor data from the various internal sensors. In another embodiment, the system is operable to curate the inertial measurement unit sensor data into a property of acceleration, and the sub-properties orientation and angular rate of the autonomous vehicle 300.

The infrared camera is used to create a measurement from objects based on the heat signature of the objects. For autonomous vehicles, infrared cameras/sensors are important to detect living beings like pedestrians or animals. Importantly, infrared cameras are operable to create measurements from objects in low-light, fog, or through other obstacles. As such, in one embodiment, the system is operable to curate the infrared camera data into a property of object detection.

The load sensor is used to create measurements from stability of the autonomous vehicle 300. The load sensor creates a measurement from weight distribution of the autonomous vehicle 300 and transmits electrical signals to mechanical components of the autonomous vehicle 300 by adjusting suspension, braking, and steering. By adjusting the mechanical components, the load sensor is operable to assist in navigation by determining weight distribution in a particular direction. As such, in one embodiment, the system is operable to curate the load sensor data into a property of weight distribution and a sub-property of vehicle direction.

Importantly, the aforementioned autonomous vehicle 300 sensor data curation examples are curated with known data. In the embodiment depicted in FIG. 3, known sensor data is able to include sensor data from the LiDAR sensor 301, the radar sensor 302, the ultrasonic sensor, the visible spectrum camera, the GPS sensor, the inertial measurement unit sensor, the infrared sensor, the load sensor, and/or any other sensor data used in autonomous transportation.

After the autonomous vehicle 300 sensor data is curated, the system is operable to receive a query. In the embodiment depicted in FIG. 3, the autonomous vehicle 300 is operable to automatically avoid collision with an object in front of the autonomous vehicle 300. In this embodiment, a computer processor controlling the autonomous vehicle 300 is operable to adjust mechanical components (i.e., brakes, steering, etc.) of the autonomous vehicle 300 to avoid collision. As such, the autonomous vehicle 300 automatically queries the system about the distance from the autonomous vehicle 300 to the object so the autonomous vehicle 300 knows whether to apply the brakes or not. The system of the present invention, in one embodiment, must assess which sensor data is sufficiently linked to ensure the autonomous vehicle 300 only brakes when necessary. In doing so, the system uses curated known sensor data and curated new sensor data to perform data linking based on a query received by the system by the autonomous vehicle 300.

As an example, in one embodiment, where the query received by the system includes whether or not an autonomous vehicle 300 should brake to avoid a collision, new sensor data is able to include the radar sensor 302, the ultrasonic sensor, the visible spectrum camera, the GPS sensor, the inertial measurement unit, the infrared camera sensors, the depth cameras, and/or the load sensors, and known sensor data is able to include the LiDAR sensor 301. In one embodiment, the new sensor data is operable include any sensor and known sensor data is operable to include any sensor. For the purpose of this example, the LiDAR sensor 301 data is the known sensor data, and the radar sensor 302 data is the new sensor data. An illustration calculation for these sensors is included because the LiDAR sensor 301 is operable to determine the distance the autonomous vehicle 300 is away from an object and the radar sensor 302 is operable to determine the distance the autonomous vehicle 300 is away from the object, which the system calculates whether or not the distance from the autonomous vehicle 300 measured by the LiDAR sensor 301 and the radar sensor 302 is linked. The known sensor data is curated by a sub-property of distance from the autonomous vehicle 300 to the object. In one embodiment, the LiDAR sensor 301 sub-property of the distance the autonomous vehicle 300 is from the object is measured in the following three ways: the object is within braking distance, the object is not within braking distance, or the object is not detected. The new sensor data is curated by a distance to an object property. In one embodiment, the distance to an object property in the new sensor is measured in the following three ways: the object is within braking distance, the object is not within braking distance, or the object is not detected. In another embodiment, the LiDAR sensor 301 and the radar sensor 302 are operable to collect distance over a predetermined period of time to calculate a velocity of the autonomous vehicle 300.

Since the query received by the system for the autonomous vehicle 300 is whether or not to brake, linking calculates if the data from two or more sensors are mathematically correlated based in part on each property and/or sub property. For this example, the system calculates whether the correlation between the LiDAR sensor 301 data and the radar sensor 301 data is linked above a mathematical threshold to fuse the sensor data to help provide information regarding sensor accuracy for the actual distance between the autonomous vehicle 300 and the object. Taking the known sensor data for the LiDAR sensor 301, the property of distance from the autonomous vehicle 300 to the object is either within braking distance, not within braking distance, or the object is not detected.

In this example, the LiDAR sensor 301 records a property of distance from the autonomous vehicle 300 to an object over a period of time (i.e., a data collection period). In doing so, the LiDAR sensor 301 records a plurality of data points over the data collection period. The artificial intelligence engine is operable to generate a function that accurately represents the plurality of data points over the data collection period the LiDAR sensor 301 recorded. The artificial intelligence engine then averages the amount of time the LiDAR sensor 301 recorded an object within braking distance, not within braking distance, and/or not detected at all over the data collection period.

Similarly, the radar sensor 302 provides a property of distance from the autonomous vehicle 300 to the object over the same data collection period the LiDAR sensor 301 recorded distance from the autonomous vehicle 300 to the object. In doing so, the radar sensor 302 records a plurality of data points over the data collection period. The artificial intelligence engine is operable to generate a function that accurately represents the plurality of data points over the data collection period the radar sensor 302 recorded. The artificial intelligence engine then averages the amount of time the radar sensor 302 recorded an object within braking distance, not within braking distance, and/or not detected at all over the data collection period.

In one example, a ball rolled in front of autonomous vehicle 300 such that the ball was not detected, came into a field of view, traveled in front of the vehicle, then continued rolling beyond the field of view of the LiDAR sensor 301 and the radar sensor 302. The LiDAR sensor 301 and the radar sensor 302 detected the ball within braking distance, not within braking distance, then each sensor did not detect the ball at all, as summarized by the data herein.

The artificial intelligence engine is operable to curate each measurement from the LiDAR sensor 301 that the object was within braking distance, not within braking distance, and/or not detected at all. Simultaneously, the AI engine is further operable to curate each measurement from the radar sensor 302 that the object was within braking distance, not within braking distance, and/or not detected at all. Using the LiDAR sensor 301 data and the radar sensor 302 data, the AI engine calculates how much time over the data collection period that each measurement from the radar sensor 302 that the object was within braking distance, not within braking distance, and not detected at all corresponds to each measurement from the LiDAR sensor 301 that the object was within braking distance, not within braking distance, and/or not detected at all.

For example, the system averages the amount of time the LiDAR sensor 301 and the radar sensor 302 simultaneously measured that the object was within braking distance, not within braking distance, and not detected at all. The system summarizes the collected data in a table. Each numerical value in the table represents an amount of time within the data collection period that each sensor measured the corresponding fluctuation. For example, 0.9 in the "Radar Detects Object within Braking Distance" column and "LiDAR Detects Object within Braking Distance" row represents 0.9 seconds in the sensor data over the data collection period that both the LiDAR sensor 301 and the radar sensor 302 recorded the object within braking distance.

In this example, measurements for the distance to the object detected by the LiDAR sensor 301 are the LiDAR detects object within braking distance, LiDAR detects object outside of braking distance, and LiDAR does not detect object. The measurements for the distance to the object detected by the radar sensor 302 are the radar detects object within braking distance, radar detects object outside of braking distance, and radar does not detect object.

The system completes the collected data summary for each property, which is summarized below.

|  | Radar Detects Object within Braking Distance | Radar Detects Object outside of Braking Distance | Radar Does Not Detect Object |
| --- | --- | --- | --- |
| LiDAR Detects Object within Braking Distance | 0.9 | 0.9 | 0.01 |
| LiDAR Detects Object outside of Braking Distance | 0.9 | 0.9 | 0.01 |
| LiDAR Does Not Detect Object | 0.01 | 0.01 | 0.9 |

The larger the value, the more likely that sensor measurement is correlated to the new sensor data before the linking calculation is complete. In this example, 0.9 in the "Radar Detects Object within Braking Distance" column in the "LiDAR Detects Object within Braking Distance" row represents the amount of time, in seconds, that the LiDAR sensor 301 and the radar sensor 302 measured that the object was within braking distance.

Using the joint probability distribution table, the system is operable to calculate the conditional probability ($P(Y|X)$), where X is LiDAR sensor 301 data and Y is radar sensor 302 data. In this case, the conditional probability calculates the probability that the distance between the autonomous vehicle 300 detected by the LiDAR sensor 301 is correlated to Radar Detects Object within Braking Distance, Radar Detects Object outside Braking Distance, and Radar Does Not Detect Object. The system calculates the conditional probability as follows: P(Radar Detects Object within Braking Distance|LiDAR Detects Object within Braking Distance)=0.9/(0.9+0.9+0.01)=0.497. As another example, P(Radar Does Not Detect Object|LiDAR Does Not Detect Object)=0.9/(0.9+0.01+0.01)=0.978 This calculation is completed for each P(Y|X). A summary of the completed calculations is below.

|  | Radar Detects Object within Braking Distance | Radar Detects Object outside of Braking Distance | Radar Does Not Detect Object |
|---|---|---|---|
| LiDAR Detects Object within Braking Distance | 0.497 | 0.497 | 0.006 |
| LiDAR Detects Object outside of Braking Distance | 0.497 | 0.497 | 0.006 |
| LiDAR Does Not Detect Object | 0.011 | 0.011 | 0.978 |

Using the recorded data, the system is operable to calculate the probability that the LiDAR sensor 301 measures or does not measure the object within the data collection period. In this example, the collected data over the data collection period calculated that the LiDAR sensor 301 is 49% likely record the object is within braking distance, 49% likely to record the object is not within braking distance, and 2% to not record the object.

Using the conditional probability P(Y|X), the system then calculates the joint probability matrix P(X,Y). The joint probability matrix is a simple multiplication of the conditional probability matrix multiplied by the probability that the LiDAR sensor 301 measures or does not measure the object within the data collection period. The LiDAR sensor 301 probabilities are converted into a vector p(x1), p(x2), and p(x3). In this case, <0.49, 0.49, 0.02>. Each value is multiplied by the corresponding row such that each LiDAR Detects Object within Braking Distance value is multiplied by 0.49, each LiDAR Detects Object outside of Braking Distance is multiplied by 0.49, and each LiDAR Does Not Detect Object value is multiplied by 0.02. A summary of the completed joint probability matrix P(X,Y) is included below.

|  | Radar Detects Object within Braking Distance | Radar Detects Object outside of Braking Distance | Radar Does Not Detect Object |
|---|---|---|---|
| LiDAR Detects Object within Braking Distance | 0.244 | 0.244 | 0.0029 |
| LiDAR Detects Object outside of Braking Distance | 0.244 | 0.244 | 0.0029 |
| LiDAR Does Not Detect Object | 0.00022 | 0.00022 | 0.019 |

Using the joint probability matrix P(X,Y), the system is operable to calculate probabilities for each LiDAR sensor 301 scenario by summing each column of the joint probability matrix P(X,Y). In this example, probability p(y1) equals the sum of all values in the Radar Detects Object within Braking Distance column, probability p(y2) equals the sum of all values in the Radar Detects Object outside of Braking Distance column, and probability p(y3) equals the sum of all values in the Radar Does Not Detect Object column. As such, p(y1)=0.488, p(y2)=0.488, and p(y3)=0.025.

Using the p(y1), p(y2), and p(y3) values, the system is operable to calculate the conditional probability matrix P(X|Y) by dividing each column of the joint probability matrix P(X,Y) by p(y1), p(y2), and p(y3). For example, each value in the Radar Detects Object within Braking Distance of the joint probability matrix is divided by p(y1). In this case, P(LiDAR Detects Object within Braking Distance|Radar Detects Object within Braking Distance)=0.244/0.488=0.499. The system calculates the P(X|Y) for all values. A summary of the calculation is included below.

|  | Radar Detects Object within Braking Distance | Radar Detects Object outside of Braking Distance | Radar Does Not Detect Object |
|---|---|---|---|
| LiDAR Detects Object within Braking Distance | 0.499 | 0.499 | 0.116 |
| LiDAR Detects Object outside of Braking Distance | 0.499 | 0.499 | 0.116 |
| LiDAR Does Not Detect Object | 0.001 | 0.001 | 0.76 |

Finally, the system is able to complete a conditional entropy calculation to determine the association between the LiDAR sensor 301 and the radar sensor 302. To do so, the system is operable uses the joint matrix probability P(X,Y), the conditional probability matrix P(X|Y), and the conditional entropy equation H(X|Y) disclosed herein. For this example, H(X|Y)=−[0.244 log (0.499)+0.244 log (0.499)+0.0029 log (0.116)+0.244 log (0.499)+0.244 log (0.499)+0.0029 log (0.116)+0.00022 log (0.001)+0.00022 log (0.001)+0.19 log (0.76)]=0.324.

The conditional entropy calculated herein is intended merely as one example conditional entropy calculation via a 3×3 matrix. However, the system is operable to include more complicated sensor data. The example is only meant to illustrate one embodiment of the system and not intended to limit the scope of the system described herein.

The closer the conditional entropy value is to zero, the stronger the link between the sensor data because a value of 0 for conditional entropy is interpreted as no additional information is needed from one sensor to fully predict, with 100% accuracy, the readings of another sensor.

In a preferred embodiment, a mathematical threshold for a weak data link and a strong data link are dynamically adjusted based on user query received by the system and field of use. The threshold limit for each linking category is operable to be user generated, application dependent, and/or dynamically adjusted by an AI model based on output or feedback.

In one embodiment, for the autonomous transportation example described herein, a mathematical threshold for a weak data link is represented by a conditional entropy between 0.33 and 0.99. A mathematical threshold for a strong link is represented by a conditional entropy between 0.329 and zero. In this example, the system determined that the conditional entropy measurement for the LiDAR sensor 301 and the radar sensor 302 is within the mathematical threshold to constitute a strong link. Therefore, the system begins to fuse data obtained from the LiDAR sensor 301 and the radar sensor 302.

The system conducts data fusion that is operable to produce new information. In the present example, the autonomous vehicle 300 query received by the system is to determine whether or not to brake based in part on the location of the object. In doing so, fusing the known distance to the object based on the LiDAR sensor 301 with the new sensor measurements from the radar sensor 302 creates a new set of data. The data fusion process creates at least an accuracy value of the radar sensor 302. In one embodiment, if the radar sensor 302 measures a different distance to the object than the LiDAR sensor 301, the system is operable to highlight discrepancies in the data and recommend which sensor reading is more accurate. Therefore, a final product of the sensor data fusion includes a sensor reading from the LiDAR sensor 301, a sensor reading from the radar sensor 302, and at least one new data point. In one embodiment, the system is operable to include a plurality of new data points.

In one embodiment, the system only fuses sensor data including a common property and/or sub-property. In another embodiment, the system fuses all data measured by each sensor, including similar and dissimilar properties and/or sub-properties. In one embodiment, the system appends, augments, and/or overlays fused data.

Once the at least one new data point is created, the system is operable to draw at least one inference based in part on the fused data. To further elaborate on this example, the data fusion occurs based in part on the autonomous vehicle 300 query received by the system. Since autonomous vehicle 300 query received by the system is whether or not to brake, in one embodiment, the at least one new data point is operable to include which sensor more accurately measures the distance to the object, if the readings are different. In one embodiment, the system is operable to infer which sensor data the autonomous vehicle 300 responds to and creates a subsequent inference about why the sensor readings measured different distances to the object (i.e., damaged internal components, faulty wiring, sensor misplacement, etc.). In another embodiment, the inference is operable to include a determination of whether or not to apply the brakes of the autonomous vehicle 300 (i.e., calculate an answer to the query received by the system). Once the system generates at least one inference, the system undergoes a validation phase to ensure the accuracy of the sensor data fusion.

The validation occurs passively and/or actively. For both validation methods, the system must complete a first round (i.e., the autonomous vehicle example described herein) and a second round (repeating the steps demonstrated in the autonomous vehicle example described herein with new data) of data collection, data curation, data fusion, and data inferencing using the same new sensor and the same known sensor. At the completion of the second round of data collection, data curation, data fusion, and data inferencing, the mathematical output of the first round is compared to the mathematical output of the second round.

In a preferred embodiment, the system dynamically adjusts the validation threshold based on user query received by the system and field of use. The threshold limit for each validation is operable to be user generated, application dependent, and/or dynamically adjusted by an AI model based on output or feedback.

In one embodiment, the system validates the sensor data fusion if the mathematical outputs are within about 1% of each other or within 1% of each other.

In one embodiment, the validation occurs actively. Active validation for autonomous transportation is able to include the autonomous vehicle 300 modifying an orientation of the LiDAR sensor 301 and/or the radar sensor 302 that the system used to fuse the data. In this case, active validation includes the autonomous vehicle 300 changing the orientation of the LiDAR sensor 301 and/or the radar sensor 302 to calculate how the LiDAR sensor 301 and the radar sensor 302 measure the change. The system measures the change in the measured distance to the object via the second round of the data collection, the data curation, the data fusion, and the data inferencing using the LiDAR sensor 301 and the radar sensor 302.

In one embodiment, the validation occurs passively. Passive validation for autonomous transportation includes the autonomous vehicle 300 not modifying the orientation of the LiDAR sensor 301 and/or the radar sensor 302 that the system measured to fuse the data. In this case, passive validation includes the system continuously collecting data on distance to the object via the LiDAR sensor 301 and the radar sensor 302. The system measures the distance to the object via the second round of the data collection, the data curation, the data fusion, and the data inferencing using the LiDAR sensor 301 and the radar sensor 302.

In this example, the system validates the data passively and concludes that the LiDAR sensor 301 and the radar sensor 302 are sufficiently correlated such that the systems data fusion is reliable and accurate.

Notably, the autonomous transportation example described herein is just one of the calculations performed by the system. However, the example is intended only to illustrate one of the plurality of calculations the system is conducting simultaneously, in real-time. The system processes a vast number of sensor readings, data curation, matrix mathematical calculations, and logarithmic computations in real-time, of which the human mind cannot practically perform.

Satellite Command and Control

Sensor data fusion for satellite command and control is applicable to be applied to satellite downlink and uplink using radio waves where a satellite and/or a base station includes more than one sensor. The present invention is operable to increase accuracy of command-and-control transmissions. Generally, to control the satellite, the base station transmits and receives radio waves (i.e., operating in a radio frequency ("RF") environment) in super high frequency (SHF) or extremely high frequency (EHF) (i.e., microwaves). Once the base station successfully transmits radio waves to a satellite (or vice versa), the successful transmission establishes a communications link where the base station and the satellite communicate using a particular frequency that was used to establish the link. Transmitting a radio wave, or a series of radio waves, to a satellite is not a trivial task. Certain bands of frequencies are used to avoid signal interference. As such, multiple radio waves may be transmitted within a frequency band. A receiver on the satellite and/or the base station must be operable to determine a useful radio wave from an RF signal that includes multiple transmitted signals from various sources.

Figure 4:
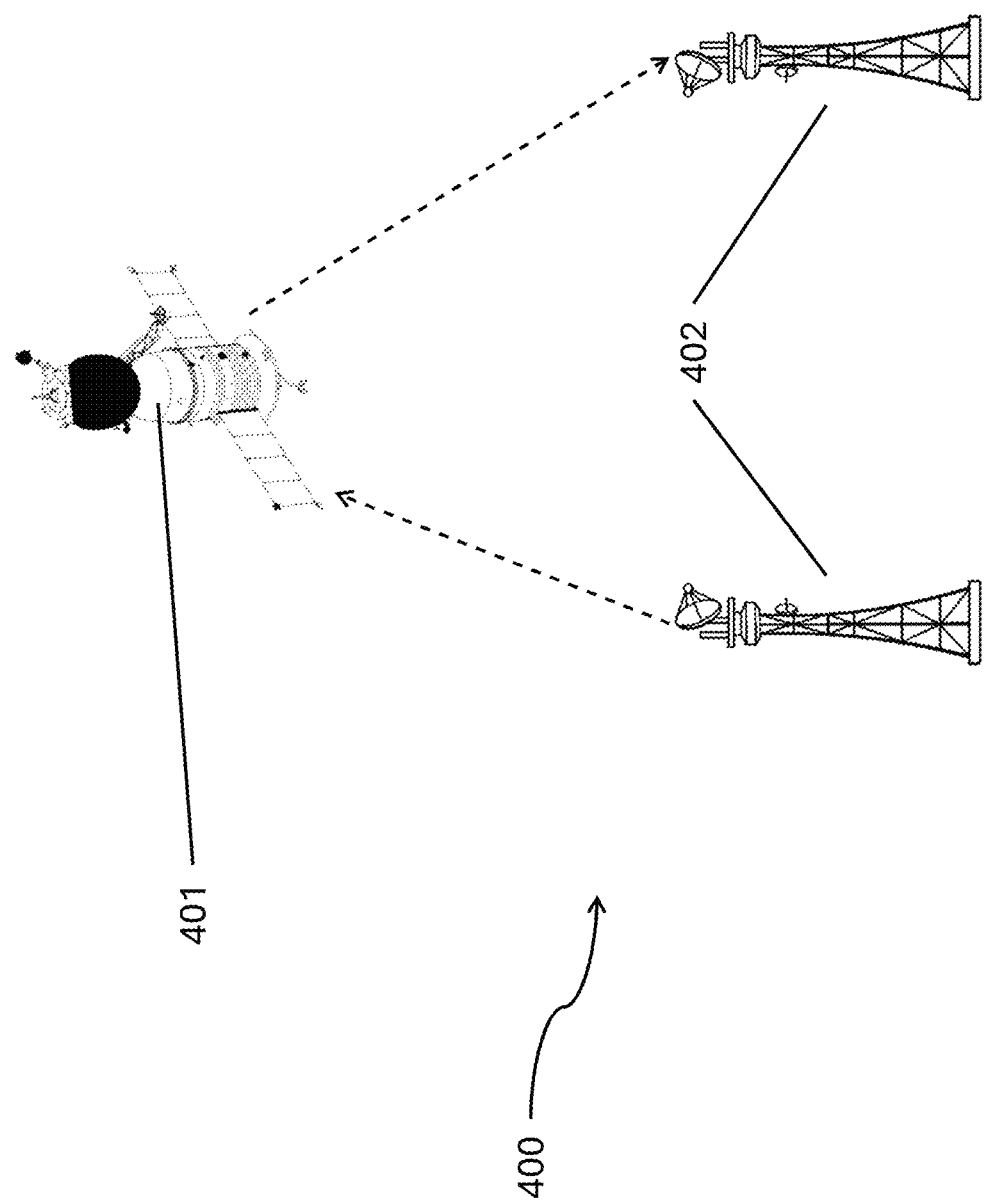
FIG. 4 illustrates satellite command and control sensor data fusion according to one embodiment of the present invention.

FIG. 4 illustrates sensor data fusion for a system for satellite command and control 400 according to one embodiment of the present invention. The satellite 401 and/or the base station 402 includes at least two sensors. In one embodiment, the satellite 401 and/or base station 402 includes a thermal power sensor, a diode detector, a spectrometer, and/or any other sensor used in satellite command and control.

The thermal power sensor is used to measure a radio frequency power within a radio wave. The thermal power sensor, generally, is designed with material which absorbs energy, causing a temperature within the thermal power sensor to rise/fall as an RF signal hits the thermal power sensor. Once the temperature changes, a temperature sensing element (i.e., thermocouple) measures the change in temperature caused by the RF signal. By measuring the temperature change, the thermal power sensor converts the temperature into a corresponding radio wave power level. Typically, once a power level of an RF signal is known, the thermal power sensor is able to calculate the amplitude of the RF signal. As such, in one embodiment, the system curates the thermal power sensor data into a property of RF signal power, and a sub-property of RF signal amplitude.

The diode detector is used to measure a power level of an RF signal. Generally, the diode detector uses unidirectional current flow, which enables the diode detector to receive a positive half cycle of the RF signal. The diode detector uses the positive half cycle of the RF signal to create a DC voltage proportional to an amplitude of the RF signal. Since a power level of the RF signal is generally proportional to the amplitude of the RF signal squared, the diode detector is able to calculate the power level of the RF signal. As such, in one embodiment, the system curates the diode detector data into a property of RF signal amplitude, and a sub-property of RF signal power.

The spectrometer is used to measure a strength of an RF signal within a specific band of a frequency. The spectrometer is a complex sensor that uses a combination of filters, amplifiers, and detectors to selectively isolate and measure specific frequencies within an RF signal. Generally, the spectrometer is operable to create a visual representation of spectral content of an RF signal by displaying a frequency of the RF signal on one axis and the strength of the RF signal on another axis. As such, in one embodiment, the system is operable to curate the spectrometer sensor data into a property of signal strength, and a sub-property of frequency.

Importantly, the aforementioned system for satellite command and control sensor data curation examples are curated with known data. In the embodiment depicted in FIG. 4, known sensor data is able to include sensor data from the thermal power sensor, the diode detector, and/or the spectrometer.

After the satellite command and control 400 sensor data is curated, the system is operable to receive a query. In the embodiment depicted in FIG. 4, the base station 402 is operable to transmit command signals to the satellite 401 to adjust an orientation of the satellite 401. In this embodiment, a user and/or a computer creates a query that is received by the system to adjust the orientation of the satellite 401. For example, the user requires adjusting the orientation of the satellite 401 to capture image data of a particular portion of the planet. As another example, the computer requires adjusting the orientation of the satellite 401 at a predetermined time based on orbital location. As such, the user and/or the computer queries the system to adjust the orientation of the satellite 401 by transmitting an RF signal via the base station 402. The system of the present invention, in one embodiment, must assess which sensor data obtained via sensors on the satellite 401 is sufficiently linked to ensure the orientation of the satellite 401 is properly adjusted based on the user and/or computer query received by the system. In this example, proper RF signal detection is critical to ensure the orientation of the satellite 401 is compliant with the user and/or computer query received by the system. Each sensor on the satellite 401 is operable to include slightly different satellite orientation details for the satellite 401. As such, it is important to curate sensor data obtained from the sensors on the satellite 401 to ensure the precise orientation of the satellite 401. In doing so, the system uses curated known sensor data and curated new sensor data to perform data linking based on the query by the user and/or computer received by the system.

As an example, in one embodiment, where the query received by the system includes a command signal to adjust orientation of the satellite 401, new sensor data is able to include the thermal power sensor data and the spectrometer sensor data, and known sensor data is able to include the diode detector data. In one embodiment, the new sensor data includes any sensor and the known sensor data includes any sensor. For the purpose of this example, the diode detector data is the known sensor data, and the thermal power sensor is the new sensor data. An illustrative calculation for these sensors is included because the diode detector is operable to determine the power of the RF signal and convert the RF signal into the satellite 401 orientation command, and the thermal power sensor is operable to determine the power of the RF signal and convert the RF signal into the satellite 401 orientation command, which the system calculates whether or not the RF signal power measured by the diode detector and the thermal power sensor are linked. The known sensor data is curated by a sub-property of the power of the RF signal. The diode detector sub-property of the power of the RF signal is measured in the following three ways: the RF signal power is decreasing, the RF signal power in static, or the RF signal power is increasing. The RF signal power property in the new sensor is measured in the following three ways: the RF signal power is decreasing, the RF signal power is static, or the RF signal power is increasing.

Since a user and/or computer query received by the system is to adjust the orientation of the satellite 401, linking calculates if the data from two or more sensors are mathematically correlated based in part on each property and/or sub property. In this example, the system calculates whether the correlation between the diode detector and the thermal power sensor is linked above a mathematical threshold to fuse the data to help provide information regarding sensor accuracy for the power of the RF signal, and in turn, the accuracy of the orientation command. Taking the known sensor data for the diode detector, the property of RF signal strength is either decreasing, remaining static, or increasing.

In this example, the thermal power sensor measures a property of RF signal power over a period of time (i.e., a data collection period). In doing so, the thermal power sensor records a plurality of data points over the data collection period. The artificial intelligence engine is operable to generate a function that accurately represents the plurality of data points over the data collection period the thermal power sensor recorded. The artificial intelligence engine then averages the amount of time the thermal power sensor recorded an RF signal power decrease, an RF signal power remaining static, and/or an RF signal power increase over the data collection period.

Similarly, the diode detector measures a property of RF signal power over the same data collection period as the thermal power sensor. In doing so, the diode detector records a plurality of data points over the data collection period. The artificial intelligence engine is operable to generate a function that accurately represents the plurality of data points over the data collection period the diode detector recorded. The artificial intelligence engine then averages the amount of time the diode detector recorded an RF signal power decrease, an RF signal power remaining static, and/or an RF signal power increase over the data collection period.

In this example, an RF signal was emitted from base station 402 including command instructions for the satellite 401 where each sensor measured the RF signal.

The artificial intelligence engine is operable to curate each measurement from the thermal power sensor that the RF signal power was decreasing, static, or increasing. Simultaneously, the artificial intelligence engine is operable to curate each measurement from the diode detector that the RF signal power was decreasing, static, or increasing. The artificial intelligence engine then calculates how much time over the data collection period that each measurement from the thermal power sensor corresponds to each measurement from the diode detector.

For example, the system averages the amount of time the thermal power sensor and the diode detector simultaneously measured that the RF power signal was decreasing, static, and/or increasing. The system summarizes the collected data in a table. Each numerical value in the table represents an amount of time within the data collection period that each sensor measured the corresponding fluctuation. For example, 0.9 in the "Thermal Power Sensor Detects Decrease in RF Power" column and "Diode Detector Detects Decrease in RF Power" row represents 0.9 seconds in the sensor data over the data collection period that both the thermal power sensor and the diode detector recorded the change in RF signal power.

In this example, measurements for the RF signal power recorded by the diode detector are diode detector detects decrease in RF power, diode detector detects static RF power, and diode detector detects increase in RF power. The measurements for the RF signal power recorded by the thermal power sensor are thermal power sensor detects decrease in RF power, thermal sensor detects static RF power, and thermal sensor detects increase in RF power.

The system completes the collected data summary for each property, which is summarized below.

|  | Thermal Power Sensor Detects Decrease in RF Power | Thermal Sensor Detects Static RF Power | Thermal Sensor Detects Increase in RF Power |
| --- | --- | --- | --- |
| Diode Detector Detects Decrease in RF Power | 0.9 | 0.01 | 0.01 |
| Diode Detector Detects Static RF Power | 0.01 | 0.8 | 0.01 |
| Diode Detector Detects Increase in RF Power | 0.01 | 0.01 | 0.9 |

The larger the value, the more likely that sensor measurement is correlated to the new sensor data before the linking calculation is complete. In this example, 0.9 in the "Thermal Power Sensor Detects Decrease in RF Power" column in the "Diode Detector Detects Decrease in RF Power" row represents the amount of time, in seconds, that both sensors measured a decrease in RF power.

Using the joint probability distribution table, the system is operable to calculate the conditional probability (P(Y|X)), where X is diode detector data and Y is thermal power sensor data. In this case, the conditional probability calculates the probability that the RF signal power changes measured by the diode detector is correlated to Thermal Power Sensor Detects Decrease in RF Power, Thermal Sensor Detects Static RF Power, and Thermal Sensor Detects Increase in RF Power. The system calculates the conditional probability as follows: P(Thermal Sensor Detects Increase in RF Power-|Diode Detector Detect Increase in RF Power)=0.9/(0.9+0.01+0.01)=0.98. As another example, P(Thermal Sensor Detects Static RF Power|Diode Detector Detects Static RF Power)=0.8/(0.8+0.01+0.01)=0.976 This calculation is completed for each P(Y|X). A summary of the completed calculations is below.

|  | Thermal Power Sensor Detects Decrease in RF Power | Thermal Sensor Detects Static RF Power | Thermal Sensor Detects Increase in RF Power |
| --- | --- | --- | --- |
| Diode Detector Detects Decrease in RF Power | 0.978 | 0.011 | 0.011 |
| Diode Detector Detects Static RF Power | 0.012 | 0.976 | 0.012 |
| Diode Detector Detects Increase in RF Power | 0.011 | 0.011 | 0.978 |

Using the recorded data, the system is operable to calculate the probability that the diode detector detects fluctuations in RF signal power over the data collection period. In this example, the collected data over the data collection period calculated that the diode detector is 70% likely record that the RF signal power is decreasing, 10% likely to record the RF signal power is static, and 20% likely to record the RF signal power is increasing.

Using the conditional probability P(Y|X), the system then calculates the joint probability matrix P(X,Y). The joint probability matrix is a simple multiplication of the conditional probability matrix multiplied by the probability that the diode detector data is 70% likely to record that the RF signal power is decreasing, 10% likely to record that the RF signal power is static, and 20% likely to record that the RF signal power is increasing. The diode detector fluctuation probabilities are converted into a vector p(x1), p(x2), and p(x3). In this case, <0.70, 0.10, 0.20>. Each value is multiplied by the corresponding row such that each Diode Detector Detects Decrease in RF Power value is multiplied by 0.70, each Diode Detector Detects Static RF Power value is multiplied by 0.10, and each Diode Detector Detects Increase in RF Power value is multiplied by 0.20. A summary of the completed joint probability matrix P(X,Y) is included below.

|  | Thermal Power Sensor Detects Decrease in RF Power | Thermal Sensor Detects Static RF Power | Thermal Sensor Detects Increase in RF Power |
| --- | --- | --- | --- |
| Diode Detector Detects Decrease in RF Power | 0.685 | 0.0077 | 0.0077 |
| Diode Detector Detects Static RF Power | 0.0012 | 0.0976 | 0.0012 |

-continued

|  | Thermal Power Sensor Detects Decrease in RF Power | Thermal Sensor Detects Static RF Power | Thermal Sensor Detects Increase in RF Power |
|---|---|---|---|
| Diode Detector Detects Increase in RF Power | 0.0022 | 0.0022 | 0.1956 |

Using the joint probability matrix P(X,Y), the system is operable to calculate probabilities for each diode detector scenario by summing each column of the joint probability matrix P(X,Y). In this example, probability p(y1) equals the sum of all values in the Thermal Power Sensor Detects Decrease in RF Power column, probability p(y2) equals the sum of all values in the Thermal Sensor Detects Static RF Power column, and probability p(y3) equals the sum of all values in the Thermal Sensor Detects Increase in RF Power column. As such, p(y1)=0.6884, p(y2)=0.1075, and p(y3)=0.2045.

Using the p(y1), p(y2), and p(y3) values, the system is operable to calculate the conditional probability matrix P(X|Y) by dividing each column of the joint probability matrix P(X,Y) by p(y1), p(y2), and p(y3). For example, each value in the Thermal Power Sensor Detects Decrease in RF Power the joint probability matrix is divided by p(y1). In this case, P(Diode Detector Detects Decrease in RF Power|Thermal Power Sensor Detects Decrease in RF Power)=0.685/0.6884=0.995. The system calculates the P(X|Y) for all values. A summary of the calculation is included below.

|  | Thermal Power Sensor Detects Decrease in RF Power | Thermal Sensor Detects Static RF Power | Thermal Sensor Detects Increase in RF Power |
|---|---|---|---|
| Diode Detector Detects Decrease in RF Power | 0.995 | 0.0716 | 0.0377 |
| Diode Detector Detects Static RF Power | 0.0017 | 0.908 | 0.0063 |
| Diode Detector Detects Increase in RF Power | 0.0033 | 0.0204 | 0.956 |

Finally, the system is able to complete a conditional entropy calculation to determine the association between the diode detector and the thermal power sensor. To do so, the system is operable uses the joint matrix probability P(X,Y), the conditional probability matrix P(X|Y), and the conditional entropy equation H(X|Y) disclosed herein. For this example, H(X|Y)=−[0.685 log (0.995)+0.0077 log (0.0716)+0.0077 log (0.0377)+0.0012 log (0.0017)+0.0976 log (0.908)+0.0012 log (0.0063)+0.0022 log (0.0033)+ 0.0022 log (0.0204)+0.1956 log (0.956)]=0.044.

The conditional entropy calculated herein is merely one example of conditional entropy calculation via a 3×3 matrix. However, the system is operable to include more complicated sensor data. The example only illustrates one embodiment of the system and is not intended to limit the scope of the system described herein.

The closer the conditional entropy value is to zero, the stronger the link between the sensor data because a value of 0 for conditional entropy is interpreted as no additional information is needed from one sensor to fully predict, with 100% accuracy, the readings of another sensor.

In a preferred embodiment, a mathematical threshold for a weak data link and a strong data link are dynamically adjusted based on user query received by the system and field of use. The threshold limit for each linking category is operable to be user generated, application dependent, and/or dynamically adjusted by an AI model based on output or feedback.

In one embodiment, for the satellite command and control (i.e., monitoring an RF environment) example described herein, a mathematical threshold for a weak data link is represented by a conditional entropy between 0.4 and 0.99. A mathematical threshold for a strong link is represented by a conditional entropy between 0.39 and zero. In this example, the system determined that the conditional entropy measurement for the diode detector and the thermal power sensor is within the mathematical threshold to constitute a strong link. Therefore, the system begins to fuse data obtained from the diode detector and the thermal power sensor.

The system conducts data fusion that is operable to produce new information. In the present example, the user and/or computer query received by the system is to adjust the orientation of the satellite 401. In doing so, fusing the known RF signal power based on the diode detector with the new sensor measurements from the thermal power sensor creates a new set of data. The data fusion process creates at least an accuracy value of the thermal power sensor. In one embodiment, if the thermal power sensor measures a different RF signal power than the diode detector, the system is operable to highlight discrepancies in the data and recommend which sensor reading is more accurate. Therefore, a final product of the sensor data fusion includes a sensor reading from the diode detector, a sensor reading from the thermal power detector, and at least one new data point. In one embodiment, the system is operable to include a plurality of new data points.

In one embodiment, the system only fuses sensor data including a common property and/or sub-property. In another embodiment, the system fuses all data measured by each sensor, including similar and dissimilar properties and/or sub-properties. In one embodiment, the system appends, augments, and/or overlays fused data.

Once the at least one new data point is created, the system is operable to draw at least one inference based in part on the fused data. To further elaborate on this example, the data fusion occurs based in part on the user and/or computer query received by the system. Since the user and/or computer query received by the system is a command signal to the satellite 401 to adjust the orientation, in one embodiment, the at least one new data point is operable to include which sensor orientation command the satellite 401 with adjust to, if the readings are different. In one embodiment, the system is operable to infer which sensor data the satellite 401 responds to and create a subsequent inference about why the sensor readings measured different RF signal power (i.e., damaged internal components, faulty wiring, sensor misplacement, etc.). In another embodiment, the inference is operable to include a determination of actual RF signal power (i.e., calculate an answer to the query received by the system). Once the system generates at least one inference, the system undergoes a validation phase to ensure the accuracy of the sensor data fusion.

The validation occurs passively and/or actively. For both validation methods, the system must complete a first round (i.e., the satellite command and control example described herein) and a second round (repeating the steps demonstrated in the satellite command and control examples described herein with new data) of data collection, data curation, data fusion, and data inferencing using the same new sensor and the same known sensor. At the completion of the second round of data collection, data curation, data fusion, and data inferencing, the mathematical output of the first round is compared to the mathematical output of the second round.

In a preferred embodiment, the system dynamically adjusts the validation threshold based on user query received by the system and field of use. The threshold limit for each validation is operable to be user generated, application dependent, and/or dynamically adjusted by an AI model based on output or feedback.

In one embodiment, the system validates the sensor data fusion if the mathematical outputs are within about 7.5% of each other or within 7.5% of each other.

In one embodiment, the validation occurs actively. Active validation for the satellite command and control 400 includes the user and/or computer modifying the property that the system measured to fuse the data. In this case, active validation includes the user and/or computer changing the RF signal power to calculate how the diode detector and the thermal power sensor measure the change. The system measures the RF signal power change via the second round of the data collection, the data curation, the data fusion, and the data inferencing using the diode detector and the thermal power sensor.

In one embodiment, the validation occurs passively. Passive validation for the satellite command and control 400 includes the user and/or computer not modifying the property that the system measured to fuse the data. In this case, passive validation includes the system continuously collecting data on the RF signal power via the diode detector and the thermal power sensor. The system measures the RF signal power measurements via the second round of the data collection, the data curation, the data fusion, and the data inferencing using the diode detector and the thermal power sensor.

In this example, the system validates the data passively and concludes that the diode detector and the thermal power sensor are sufficiently correlated such that the system's data fusion is reliable and accurate.

Notably, the satellite command and control 400 example described herein is just one of the calculations performed by the system. However, the example is intended only to illustrate one of the plurality of calculations the system is conducting simultaneously, in real-time. The system processes a vast number of sensor readings, data curation, matrix mathematical calculations, and logarithmic computations in real-time, of which the human mind cannot practically perform.

Figure 5:
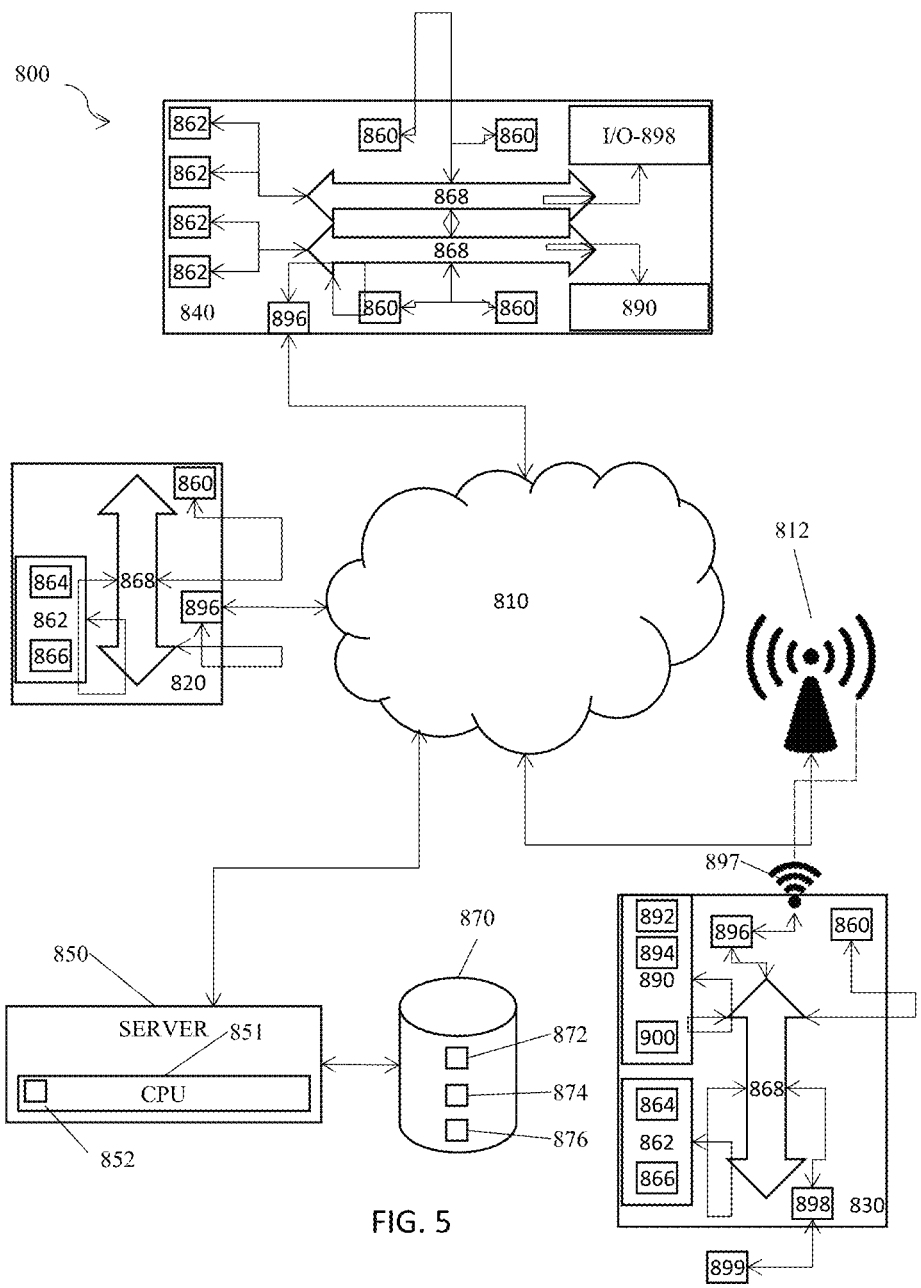
FIG. 5 illustrates a schematic diagram according to one embodiment of the present invention.

FIG. 5 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof perform calculations, process instructions for execution, and/or other manipulations of information.

In another implementation, shown as 840 in FIG. 5, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable to be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

It is also contemplated that the computer system 800 is operable to not include all of the components shown in FIG. 5, is operable to include other components that are not explicitly shown in FIG. 5, or is operable to utilize an architecture completely different than that shown in FIG. 5. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A system for sensor data fusion for sensor management and utilization, comprising:
   at least one computer processor including a memory;
   at least one curation engine, at least one link engine, at least one fusion engine, at least one inference engine, and at least one validation engine;
   at least one first sensor, being of a first sensor type, operable to measure a first parameter of a machine; and
   at least one second sensor, being of a second sensor type, operable to measure a second parameter of the machine;
   wherein the at least one computer processor is operable to analyze the first parameter and the second parameter;
   wherein the at least one computer processor is operable to receive at least one query;
   wherein the at least one curation engine is operable to curate the first parameter and the second parameter, the at least one link engine is operable to link the first parameter and the second parameter via calculating a conditional entropy between the first parameter and the second parameter, the at least one fusion engine is operable to fuse the first parameter and the second parameter, the at least one inference engine is operable to determine an inference from the first parameter and the second parameter, and the at least one validation engine is operable to validate the first parameter and the second parameter;
   wherein the at least one curation engine is operable to curate the first parameter and the second parameter by categorizing the first parameter and the second parameter into at least one property and/or sub-property based in part on the at least one query;

wherein the at least one curation engine is operable to filter the first parameter and the second parameter based in part on the at least one property and/or sub-property before storing the first parameter and the second parameter;

wherein the at least one curation engine is operable to calculate a degree of certainty that the at least one property and/or sub-property of the at least one first sensor is correlated to the at least one property and/or sub-property of the at least one second sensor;

wherein the at least one fusion engine is operable to fuse the first parameter and the second parameter, wherein the at least one fusion engine creates at least one new data set;

wherein the at least one computer processor is operable to instruct modification of the machine based on the at least one new data set; and wherein the modification of the machine includes adjusting an orientation of a satellite.

2. The system of claim 1, wherein the at least one first sensor and/or the at least one second sensor includes an accelerometer, a gyroscope, a force/torque sensor, a proximity sensor, a gear sensor, a magnetic sensor, a humidity sensor, an angle sensor, a temperature sensor, a 6-axis combo inertial sensor, a current sensor, a Light Detection and Ranging (LiDAR) sensor, radar sensor, ultrasonic sensor, visible spectrum camera, Global Positioning System (GPS) sensor, inertial measurement unit, infrared sensor, depth camera, load sensor, a thermal power sensor, a diode detector, and/or a spectrometer.

3. The system of claim 1, wherein the at least one property and/or sub-property includes a timestamp and/or a measurement over a common period of time.

4. The system of claim 1, wherein the at least one curation engine is operable to use artificial intelligence to automatically categorize the first parameter and the second parameter into the at least one property and/or sub-property based in part on historical accuracy of previous categorizations by an artificial intelligence engine.

5. The system of claim 1, wherein the at least one first sensor and the at least one second sensor are operable to measure heterogeneous, partially heterogeneous, or homogeneous machines.

6. The system of claim 1, wherein the at least one computer processor is located on or in a machine, an edge device, at least one server, and/or a cloud.

7. A method for sensor data fusion for sensor management and utilization, comprising:
providing at least one computer processor including a memory;
providing at least one curation engine, at least one link engine, at least one fusion engine, at least one inference engine, and at least one validation engine;
at least one first sensor, being of a first sensor type, measuring a first parameter of a machine; and
at least one second sensor, being of a second sensor type, measuring a second parameter of the machine;
analyzing by the at least one computer processor the first parameter and the second parameter;
receiving by the computer processor at least one query;
curating the first parameter and the second parameter via the at least one curation engine, linking the first parameter and the second parameter via the at least one link engine via calculating a conditional entropy between the first parameter and the second parameter, fusing the first parameter and the second parameter via the at least one fusion engine, determining an inference from the first parameter and the second parameter via the at least one inference engine, and validating the first parameter and the second parameter via the at least one validation engine;
curating the first parameter and the second parameter by categorizing the first parameter and the second parameter into at least one property and/or sub-property based in part on the at least one query;
filtering by the at least one curation engine the first parameter and the second parameter based in part on the at least one property and/or sub-property before storing the first parameter and the second parameter;
calculating by the at least one curation engine a degree of certainty that the at least one property and/or sub-property of the at least one first sensor is correlated to the at least one property and/or sub-property of the at least one second sensor;
fusing the first parameter and the second parameter;
creating via the at least one fusion engine at least one new data set;
instructing modification of the machine by the at least one computer processor based in part on the at least one new data set; and
wherein the modification of the machine includes adjusting an orientation of a satellite.

8. The method of claim 7, further comprising conducting pattern recognition via the at least one curation engine to calculate a statistical probability that the at least one property and/or sub-property of the first parameter and the second parameter are correlated.

9. The method of claim 7, further comprising categorizing via the at least one curation engine using artificial intelligence the at least one property and/or sub-property of the first parameter and the second parameter based in part on historical accuracy of previous categorizations by the at least one curation engine.

10. The method of claim 7, wherein the at least one first sensor and/or the at least one second sensor includes an accelerometer, a gyroscope, a force/torque sensor, a proximity sensor, a gear sensor, a magnetic sensor, a humidity sensor, an angle sensor, a temperature sensor, a 6-axis combo inertial sensor, a current sensor, a Light Detection and Ranging (LiDAR) sensor, radar sensor, ultrasonic sensor, visible spectrum camera, Global Positioning System (GPS) sensor, inertial measurement unit, infrared sensor, depth camera, load sensor, a thermal power sensor, a diode detector, and/or a spectrometer.

11. The method of claim 7, further comprising curating the first parameter and the second parameter in real-time.

12. The method of claim 7, wherein the at least one property and/or sub-property includes a timestamp and/or a measurement over a common period of time.

13. The method of claim 7, wherein the first parameter and the second parameter are heterogeneous, partially heterogeneous, or homogeneous machines.

14. A system for sensor data fusion for sensor management and utilization, comprising:
at least one computer processor including a memory;
at least one curation engine, at least one link engine, at least one fusion engine, at least one inference engine, and at least one validation engine;
at least one first sensor, being of a first sensor type, operable to measure a first parameter of a machine; and
at least one second sensor, being of a second sensor type, operable to measure a second parameter of the machine;

wherein the at least one computer processor is operable to analyze the first parameter and the second parameter;

wherein the at least one computer processor is operable to receive at least one query;

wherein the at least one curation engine is operable to curate the first parameter and the second parameter, the at least one link engine is operable to link the first parameter and the second parameter via calculating a conditional entropy between the first parameter and the second parameter, the at least one fusion engine is operable to fuse the first parameter and the second parameter, the at least one inference engine is operable to determine an inference from the first parameter and the second parameter, and the at least one validation engine is operable to validate the first parameter and the second parameter;

wherein the at least one curation engine is operable to curate the first parameter and the second parameter by categorizing the first parameter and the second parameter into at least one common property and/or common sub-property based in part on the at least one query;

wherein the at least one curation engine is operable to filter the first parameter and the second parameter based in part on the at least one common property and/or common sub-property before storing the first parameter and the second parameter;

wherein the at least one curation engine is operable to calculate a degree of certainty that the at least one common property and/or common sub-property of the at least one first sensor is correlated to the at least one common property and/or common sub-property of the at least one second sensor;

wherein the at least one fusion engine is operable to fuse the first parameter and the second parameter, wherein the at least one fusion engine creates at least one new data set;

wherein the at least one computer processor is operable to modify the machine based in part on the at least one new data set; and wherein the modification of the machine includes adjusting an orientation of a satellite.

15. The system of claim 14, wherein the at least one common property and/or common sub-property includes a timestamp and/or a measurement over a common period of time.

16. The system of claim 14, wherein the at least one first sensor and/or the at least one second sensor includes an accelerometer, a gyroscope, a force/torque sensor, a proximity sensor, a gear sensor, a magnetic sensor, a humidity sensor, an angle sensor, a temperature sensor, a 6-axis combo inertial sensor, a current sensor, a Light Detection and Ranging (LiDAR) sensor, radar sensor, ultrasonic sensor, visible spectrum camera, Global Positioning System (GPS) sensor, inertial measurement unit, infrared sensor, depth camera, load sensor, a thermal power sensor, a diode detector, and/or a spectrometer.

17. The system of claim 14, wherein the curation engine is operable to curate the first parameter and the second parameter in real-time.

18. The system of claim 14, wherein the at least one first sensor and the at least one second sensor are operable to measure heterogeneous, partially heterogeneous, or homogeneous machines.

19. The system of claim 14, wherein the at least one curation engine is operable to use an artificial intelligence engine to automatically categorize the first parameter and the second parameter into the at least one common property and/or common sub-property based in part on historical accuracy of previous categorizations by the at least one curation engine.

* * * * *